(12) United States Patent
Shiheiber

(10) Patent No.: US 11,964,550 B2
(45) Date of Patent: Apr. 23, 2024

(54) RADIATOR SYSTEM

(71) Applicant: Nimer Ibrahim Shiheiber, Daly City, CA (US)

(72) Inventor: Nimer Ibrahim Shiheiber, Daly City, CA (US)

(*) Notice: Subject to any disclaimer, the term of this patent is extended or adjusted under 35 U.S.C. 154(b) by 56 days.

(21) Appl. No.: 17/164,296

(22) Filed: Feb. 1, 2021

(65) Prior Publication Data

US 2021/0252968 A1    Aug. 19, 2021

Related U.S. Application Data

(63) Continuation of application No. 16/851,456, filed on Apr. 17, 2020, now Pat. No. 10,906,388, which is a
(Continued)

(51) Int. Cl.
  B60K 11/04 (2006.01)
  B60K 11/06 (2006.01)
  (Continued)

(52) U.S. Cl.
  CPC .............. B60K 11/04 (2013.01); B60K 11/06 (2013.01); F01P 3/12 (2013.01); F01P 3/18 (2013.01);
  (Continued)

(58) Field of Classification Search
  CPC ......... B60K 11/04; B60K 11/02; B60K 11/06; F01P 3/18; F01P 2003/182;
  (Continued)

(56) References Cited

U.S. PATENT DOCUMENTS 1,400,878 A * 12/1921 Howe ...................... F01P 3/18
                                                                  165/110
2,045,002 A    6/1936 Sperry
                     (Continued)

FOREIGN PATENT DOCUMENTS

EP        0969189        1/2000
EP        0969189 A1 *  1/2000  .............. F01P 7/164
                    (Continued)

Primary Examiner — Jianying C Atkisson
Assistant Examiner — For K Ling
(74) Attorney, Agent, or Firm — Scheef & Stone, LLP; Robin L. Barnes

(57) ABSTRACT

An improved radiator mounting and cooling system for use in automobiles allows multiple components to be incorporated into the same unit, limiting the need for accessories to be mounted to inner fenders or firewall. A circulating vortex of air is pulled through a front grill and vortex tubes disposed through sides of the radiator system to improve cooling efficiency. An outer shroud protects interior components and creates a sealed core cavity allowing air to only enter through vortex tubes and front grill and exit through a rear grill. A self-circulating cooling system provides additional cooling of coolant. A fan system pulls around 5000 CFM of air through the core cavity. An optional secondary coolant pumping system allows coolant to be pumped when needed. A control system controls activation of the fan system and secondary coolant pumping system based on signals from sensors.

21 Claims, 17 Drawing Sheets

Related U.S. Application Data continuation of application No. 15/657,480, filed on Jul. 24, 2017, now Pat. No. 10,661,650.

(60) Provisional application No. 62/365,683, filed on Jul. 22, 2016, provisional application No. 62/365,771, filed on Jul. 22, 2016.

(51) Int. Cl.

| | | |
|---|---|---|
| *F01P 3/12* | (2006.01) | |
| *F01P 3/18* | (2006.01) | |
| *F04D 19/00* | (2006.01) | |
| *F04D 29/60* | (2006.01) | |
| *F04D 25/06* | (2006.01) | |
| *F04D 25/08* | (2006.01) | |

(52) U.S. Cl.
 CPC ......... *F04D 19/002* (2013.01); *F04D 29/601* (2013.01); *F04D 25/066* (2013.01); *F04D 25/082* (2013.01)

(58) Field of Classification Search
 CPC ........... F01P 2003/185; F01P 2003/187; F01P 7/161; F28D 2021/0097; F28D 1/0435; F28D 1/0443; F28D 1/0452; F28D 1/0461; F02B 29/0431; F02B 29/0425; F02B 29/0437; F28F 2009/0292; F28F 2009/0295; F28F 2009/0287; F28F 9/001; F28F 9/0002; F28F 9/0234; B62D 25/084
 See application file for complete search history.

(56) References Cited

U.S. PATENT DOCUMENTS

| | | | |
|---|---|---|---|
| 2,170,524 A | 8/1936 | Agerell et al. | |
| 2,151,082 A | 3/1939 | Chace | |
| 2,236,986 A | 4/1941 | Beeman et al. | |
| 2,543,443 A | 2/1951 | Dennis | |
| 3,635,285 A | 1/1972 | Davis | |
| 3,692,004 A * | 9/1972 | Tangue | F01P 5/06 165/122 |
| 4,006,775 A * | 2/1977 | Avrea | B60K 11/04 165/104.32 |
| 4,369,738 A | 1/1983 | Hirayama | |
| 5,046,554 A * | 9/1991 | Iwasaki | B60K 11/04 165/44 |
| 5,172,656 A * | 12/1992 | Wright | F01P 3/18 123/41.15 |
| 5,366,005 A * | 11/1994 | Kadle | F28F 9/0234 165/140 |
| 5,597,047 A * | 1/1997 | Thompson | F28F 9/002 180/68.6 |
| 5,649,587 A * | 7/1997 | Plant | F04D 29/545 165/41 |
| 5,724,925 A | 3/1998 | Ito | |
| 5,765,630 A | 6/1998 | Bloomer | |
| 5,971,062 A * | 10/1999 | Sadr | B60K 11/04 165/41 |
| 6,016,774 A * | 1/2000 | Bokkers | F28D 1/0435 123/41.1 |
| 6,155,335 A * | 12/2000 | Acre | F28F 9/002 123/41.58 |
| 6,189,492 B1 * | 2/2001 | Brown | B60S 1/50 123/41.49 |
| 6,298,906 B1 * | 10/2001 | Vize | F28F 9/002 165/41 |
| 6,684,937 B2 * | 2/2004 | Lenz | F28D 1/0435 165/41 |
| 6,871,697 B2 * | 3/2005 | Albright | F01P 11/029 165/41 |
| 6,997,143 B2 | 2/2006 | Piccirilli et al. | |
| 7,137,439 B2 * | 11/2006 | Hoshino | F04D 29/582 165/149 |
| 7,406,929 B2 * | 8/2008 | Hassdenteufel | F01P 3/20 123/41.1 |
| 7,717,208 B2 | 5/2010 | Knauer | |
| 8,100,168 B2 | 1/2012 | Jeuffe | |
| 8,459,388 B2 | 6/2013 | Kim | |
| 8,646,554 B2 * | 2/2014 | Takahashi | B62D 25/084 165/67 |
| 9,261,285 B2 | 2/2016 | Setsu et al. | |
| 9,902,254 B1 | 2/2018 | Long et al. | |
| 10,202,887 B2 | 2/2019 | Sato | |
| 2005/0279548 A1 * | 12/2005 | Kurtz, Jr. | B60K 11/04 180/68.6 |
| 2006/0081354 A1 * | 4/2006 | Miura | B62D 25/084 165/41 |
| 2006/0213640 A1 * | 9/2006 | Matsuoka | B62D 25/084 180/68.4 |
| 2006/0213644 A1 | 9/2006 | Kolb et al. | |
| 2007/0044938 A1 | 3/2007 | Farley | |
| 2008/0289796 A1 * | 11/2008 | Sasano | F02M 35/06 165/51 |
| 2009/0145592 A1 * | 6/2009 | Leitch | B60S 1/487 165/44 |
| 2009/0159239 A1 | 6/2009 | Desai | |
| 2010/0283278 A1 * | 11/2010 | Mamada | E02F 3/325 296/24.41 |
| 2014/0060784 A1 | 3/2014 | Ostapowicz et al. | |
| 2014/0290923 A1 * | 10/2014 | Huelsmann | F28D 1/05333 165/174 |
| 2015/0283895 A1 * | 10/2015 | Takahashi | B60K 6/40 180/65.21 |
| 2017/0129324 A1 | 5/2017 | Kaneko et al. | |
| 2017/0210321 A1 | 7/2017 | Sanfilippo et al. | |
| 2018/0245503 A1 | 8/2018 | Toyama et al. | |
| 2019/0143923 A1 | 5/2019 | Bischoff | |
| 2020/0300153 A1 | 9/2020 | Zoltan et al. | |

FOREIGN PATENT DOCUMENTS

| | | | |
|---|---|---|---|
| GB | 2292602 | 2/1996 | |
| GB | 2292602 A * | 2/1996 | ............ F01P 7/167 |
| JP | 2014206115 | 10/2014 | |
| JP | 2014206115 A * | 10/2014 | ............ B60K 11/02 |

* cited by examiner

RADIATOR SYSTEM

CROSS REFERENCE TO RELATED APPLICATIONS

This application is a continuation of U.S. application Ser. No. 16/851,456 filed on Apr. 17, 2020, now U.S. Pat. No. 10,906,388, which is a continuation of U.S. application Ser. No. 15/657,480 filed on Jul. 24, 2019, now U.S. Pat. No. 10,661,650, which claims the benefit of U.S. Provisional Application Ser. Nos. 62/365,683 and 62/365,771 both filed on Jul. 22, 2016.

BACKGROUND OF THE INVENTION

1. Field of the Invention

This invention relates to an improved radiator system for use in automobiles. Multiple components are incorporated into a single system and mounting frame, limiting the need for accessories to be mounted to inner fenders or firewall. Air is directed through a core cavity in a circulating vortex pattern.

2. Description of Related Art

Prior art automobile radiators comprise two heat exchange core tanks and a core made of a tubes through which hot coolant flows from one heat exchange core tank to the other. Air passes over the core tubes to cool the coolant inside the tubes. The cooled coolant is transferred from the cool heat exchange core tank to the engine to cool the engine and is then returned to the hot heat exchange core tank to be cooled in the radiator core again. A standard water (or coolant) pump circulates the coolant through the radiator. Prior art radiators do not have a mounting frame, rather parts of the radiator and accessories are mounted directly to the heat exchange core tanks. This results in stress and fatigue to the core seams, particularly with flexing, rattling and shaking during use of the automobile, which leads to radiator failure. It would be beneficial to have a mounting frame to add strength and stability and aid in protecting the core.

The heat exchange core tanks in prior art radiators are mounted to support brackets attached to the frame of the automobile. These brackets are made from sheet metal and usually have a dimple to accept the radiator. Generally, the radiator is not a perfect fit and must be forced into position to align with the brackets and dimples, which puts stress on the radiator. The heat exchange core tanks are also generally mounted with two non-vulcanized, non-fastened rubber saddles on the bottom of tanks and two non-vulcanized, non-fastened rubber saddles on the top. In time, with grease, solvent, coolant and natural extremities, these non-vulcanized, rubber saddles will swell-up and pop out of place, causing radiator failure. Other accessories, such as a power steering reservoir, are mounted to the inner fender or firewall. It is not desirable to put holes for mounting accessories in the inner fender or firewall, particularly in classic vehicles. It would be beneficial to have an improved mounting system for the radiator and other accessories.

Air flow through the radiator core in prior art radiators is over a short distance, taking about 0.7 seconds to pass through the core in a primarily front to back direction. Additionally, the shroud on prior art radiators does not create a sealed air cavity. This allows air to enter the core from the wrong direction, decreasing cooling efficiency and making the fan system work harder. It would be beneficial to have a sealed air cavity to better direct the air and prevent pull back. Prior art fan systems are external to the radiator, either bolted to the shroud or strapped to the core, which puts stress on the core. It would be beneficial to have a better mounting system for the fan to reduce stress on the core. Prior art radiators are typically made from aluminum parts, which are subject to deterioration from electrolysis. Sometimes the radiator cap will include a chain with zinc on in that can be useful in reducing damage from electrolysis, but it is usually insufficient. It would be beneficial to incorporate fitted zinc plugs into the radiator.

SUMMARY OF THE INVENTION

According to one preferred embodiment, an improved radiator system comprises a mounting frame and right and left heat exchange core tanks that are incorporated into or welded to the mounting frame. The mounting frame provides room for additional accessories, such as an external transmission cooler, power steering cooler, and a power steering fluid reservoir to be mounted. This eliminates the need to mount such accessories to the inner fender or firewall. It also allows these accessories to be in closer proximity to the radiator. Having the core tanks welded to and incorporated into part of the mounting frame also provides structural stability and strength to help eliminate failure.

According to another preferred embodiment, an improved radiator system comprises a mounting system for mounting the frame to the automobile. The mounting system preferably comprises diagonal support bars that connect an upper portion of the radiator system mounting frame to a tab or bracket welded to the vehicle frame. Preferably, these bars are turnbuckles connected with hyman joints that allow some rotation (in any direction) of the radiator system to make installation into the automobile easier. The mounting system also preferably comprises isolators to connect a bottom part of the mounting frame to standard radiator mounting brackets in the automobile. These isolators aid in securing the radiator system and in dampening vibrations.

According to another preferred embodiment, an improved radiator system comprises an internal fan system that can move up to 5000 CFM (or more) of air through the radiator system. The internal fan system, disposed inside and connected to mounting frame, preferably comprises a housing for the blades of a fan and a housing for the fan motor. Preferably, two fans are used in the fan system. Connecting fan system to the mounting frame eliminates stress on the core. According to another preferred embodiment, an improved radiator system comprises an optional secondary coolant pumping system comprising a housing for one or more secondary pumps. These pumps pump coolant from the cooled bottom portion of the right heat exchange core tank when additional cooling is needed and the primary coolant pump in the vehicle has stopped pumping or has slowed down the flow of coolant to the engine. The housing for the secondary pumping system is preferably disposed on an upper shroud connected to the mounting frame. The upper shroud preferably forms part of an outer shroud for the radiator system.

According to yet another preferred embodiment, an improved radiator system comprises a front grill and a rear grill both attached to the mounting frame. Each grill has a plurality of apertures to allow air to flow into and out of a core cavity between the grills. Most preferably, the apertures are configured into a pattern that forms a personalized design or provides information regarding the automobile into which the radiator system will be installed. These grills also add to the strength of the radiator system, protect internal components, and provide protection for the internal fan system.

In another preferred embodiment, an improved radiator system comprises a plurality of vortex tubes that are disposed through the left and right heat exchange core tanks. These tubes allow air to be pulled in from the sides of the mounting frame into an internal core cavity. The tubes are preferably disposed at an angle of around 20°-50° from a horizontal axis and measured in a direction from the right exterior of the mounting frame to the tube. This angle aids in directing the air flow into a circulating vortex pattern completely around the radiator core (not only through the middle), allowing the air to travel a greater distance and remain in the core cavity a longer period of time compared to prior art radiators to increase heat transfer efficiency. Having the vortex tubes disposed through the heat exchange core tanks also provides additional cooling inside the tanks, as the tubes are in contact with the coolant in the tanks. In another preferred embodiment, an improved radiator system combines a plurality of vortex tubes with a front and rear grill to direct air flow through the inner radiator core. An outer shroud, comprising the mounting frame and other components sealed or welded together, protects internal components and creates a sealed inner core cavity. Air enters the sealed inner core cavity only through the front grill and vortex tubes and exits only through the rear grill. The sealed inner core cavity prevents air from entering the radiator core from the wrong side.

In another preferred embodiment, an improved radiator system comprises a windshield wiper reservoir system connected to the mounting frame. The windshield wiper reservoir system preferably comprises a wiper fluid tank, a coolant overflow tank, filling ports, and dispensing ports. The windshield wiper reservoir system connects with the mounting frame to form part of the outer shroud of the radiator system.

In another preferred embodiment, an improved radiator system comprises a self-circulating cooling system. The self-circulating cooling system preferably comprises a cylindrical tank with a plurality of fins extending radially outwardly from the tank, an inlet and an outlet. A portion of cooled coolant is diverted from the right heat exchanger core tank to the self-circulating cooling system where it is further cooled and delivered to the left heat exchange core tank (without cooling the engine). According to other preferred embodiments, an improved radiator system comprises an external transmission cooler and/or an external power steering cooler. Both coolers have cylindrical tanks each with a plurality of fins extending radially outwardly from the tanks, an inlet and an outlet. These coolers are mounted to the bottom of the mounting frame. In another preferred embodiment, an improved radiator system also comprises an internal transmission cooling tube. This tube is preferably disposed in the right heat exchange core tank to transfer heat between the coolant and transmission fluid.

In another preferred embodiment, an improved radiator system comprises a control system having a plurality of sensors, such as temperature sensors, switches, and relays to send and receive signals or data. The control system preferably activates the fan system and/or optional secondary coolant pumping system in response to signals from various sensors.

Improved radiator systems according to preferred embodiments of the invention provide improved structural integrity and reduce the likelihood of failure compared to prior art radiators. They also reduce or eliminate the need to install accessories to the inner fender or firewall and provide greater flexibility in installing the radiator system in the engine compartment. Cooling efficiency is greatly increased by increased air flow through the core cavity, by creating a circulating vortex pattern for the air, and by directing air through the core cavity without pull-back. Cooling efficiency is also increased by incorporating multiple heat exchange elements into the system, in addition to the heat exchange through the radiator core. For example, vortex tubes through the heat exchange core tanks, the self-circulating cooling system, and the front grill all act to exchange heat between the coolant and air or to dissipate heat away from the radiator system.

BRIEF DESCRIPTION OF THE DRAWINGS

The radiator system of the invention are further described and explained in relation to the following drawings wherein.

DESCRIPTION OF THE PREFERRED EMBODIMENTS

Figure 1:
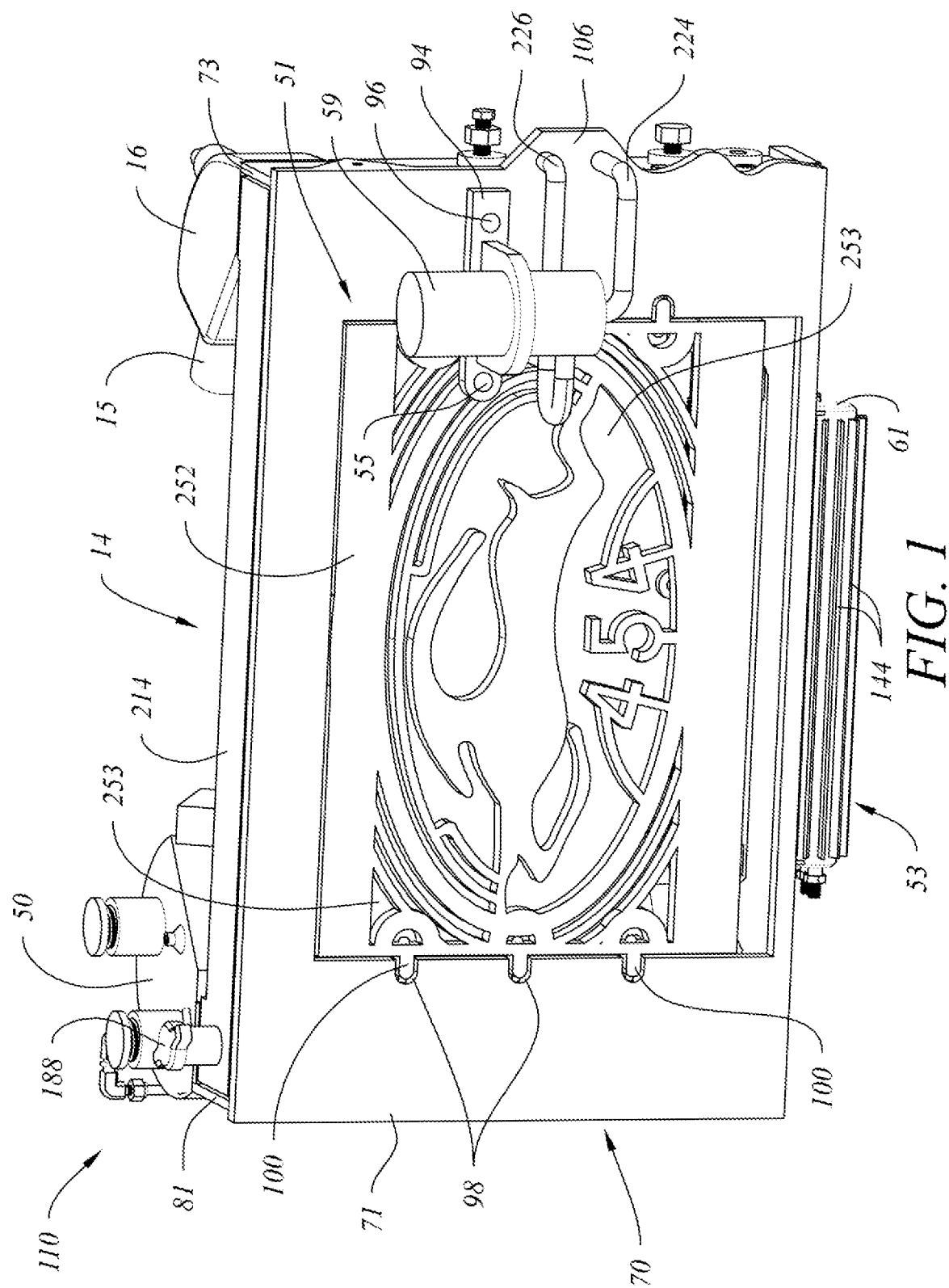
FIG. 1 is a perspective view, showing front and left sides, of a preferred embodiment of a radiator system according to the invention.

Referring to FIGS. 1-11, a preferred embodiment for radiator system 110 is shown. Radiator system 110 preferably comprises a mounting frame 70, decorative front grill 51, external transmission cooler 53, internal transmission cooling tube 34, external power steering/hydro brake cooling system 78, power steering/hydro-boost brake system reservoir 59, rear grill 75, self-circulating cooling system 20, a windshield wiper reservoir system 41, an internal fan system, a right heat exchange core tank 80, a left heat exchange core tank 82, upper shroud 14, a frame mounting system, and an optional secondary coolant pump system 151 (shown in FIGS. 12-14). Radiator system 110 also preferably comprises a control system to activate fans and optional coolant pumps, open and close valves, and send and receive signals and data based on sensor measurements, such as coolant temperature.

Figure 2:
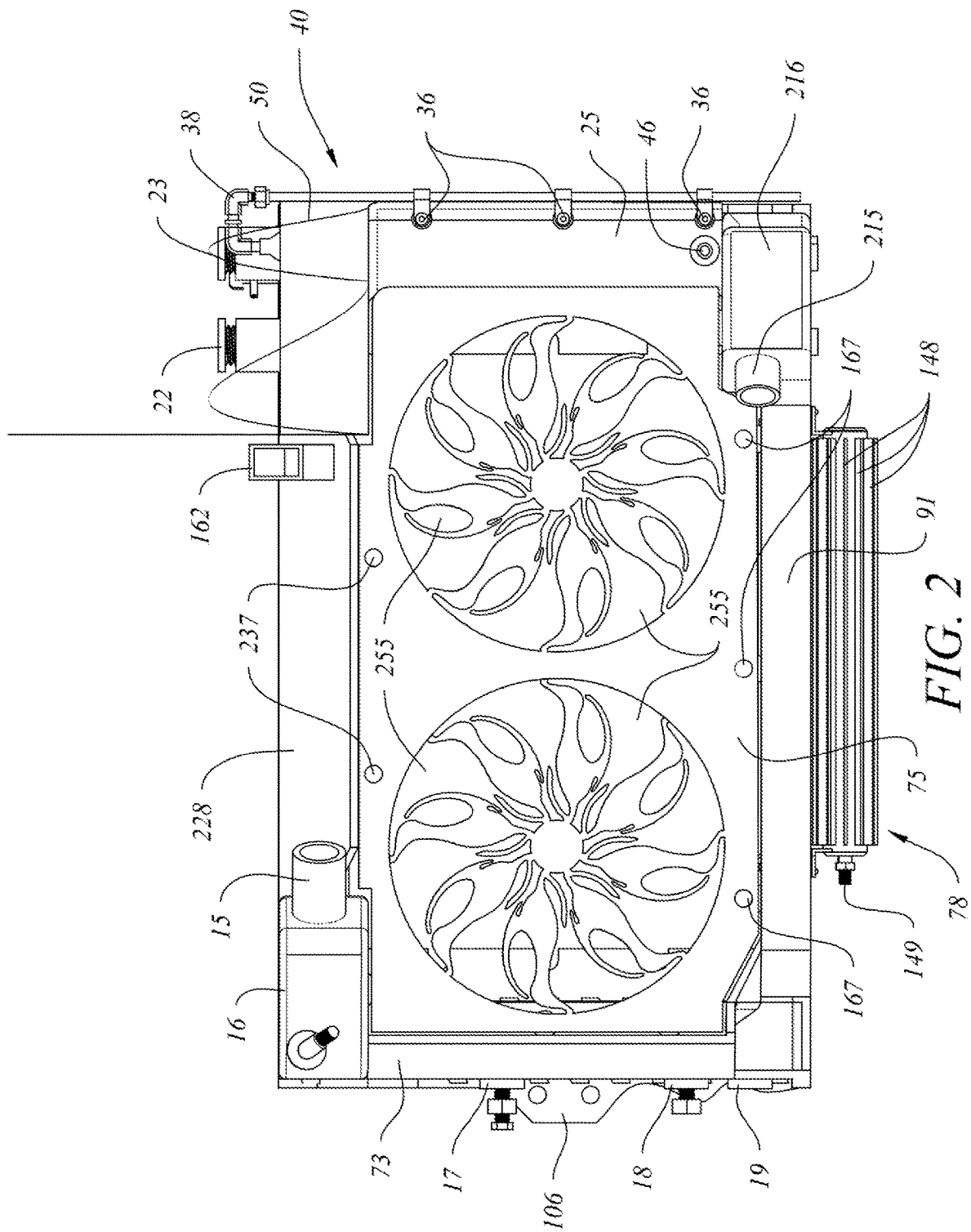
FIG. 2 is a rear elevation of the embodiment of FIG. 1.
Figure 3:
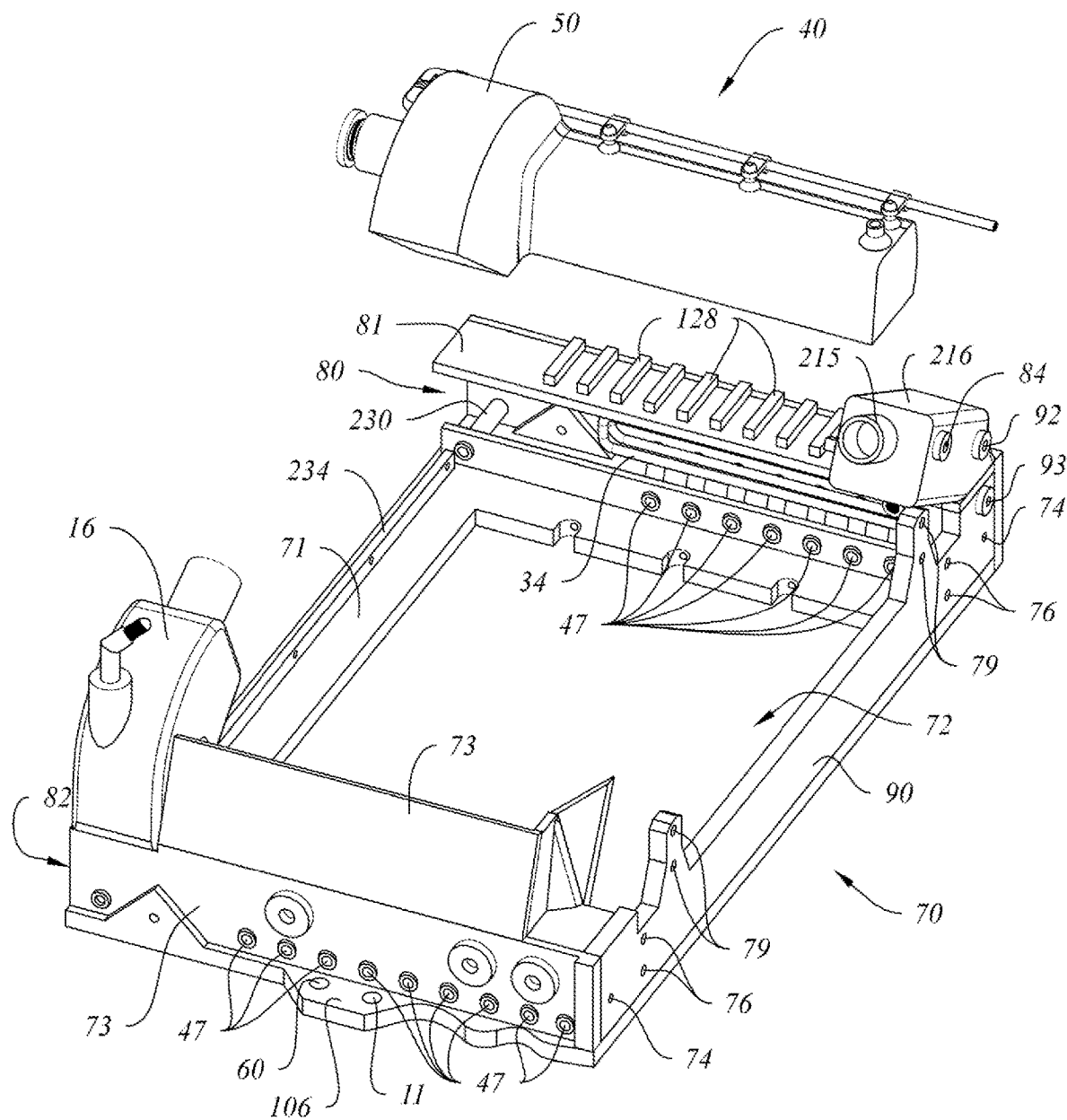
FIG. 3 is a perspective view, showing a bottom, a left exterior side, a right interior side, and rear sides, of a preferred embodiment of a mounting frame and a perspective view, showing bottom, left, and rear sides of a preferred embodiment of a windshield wiper reservoir system for a radiator system according to the invention.
Figure 6:
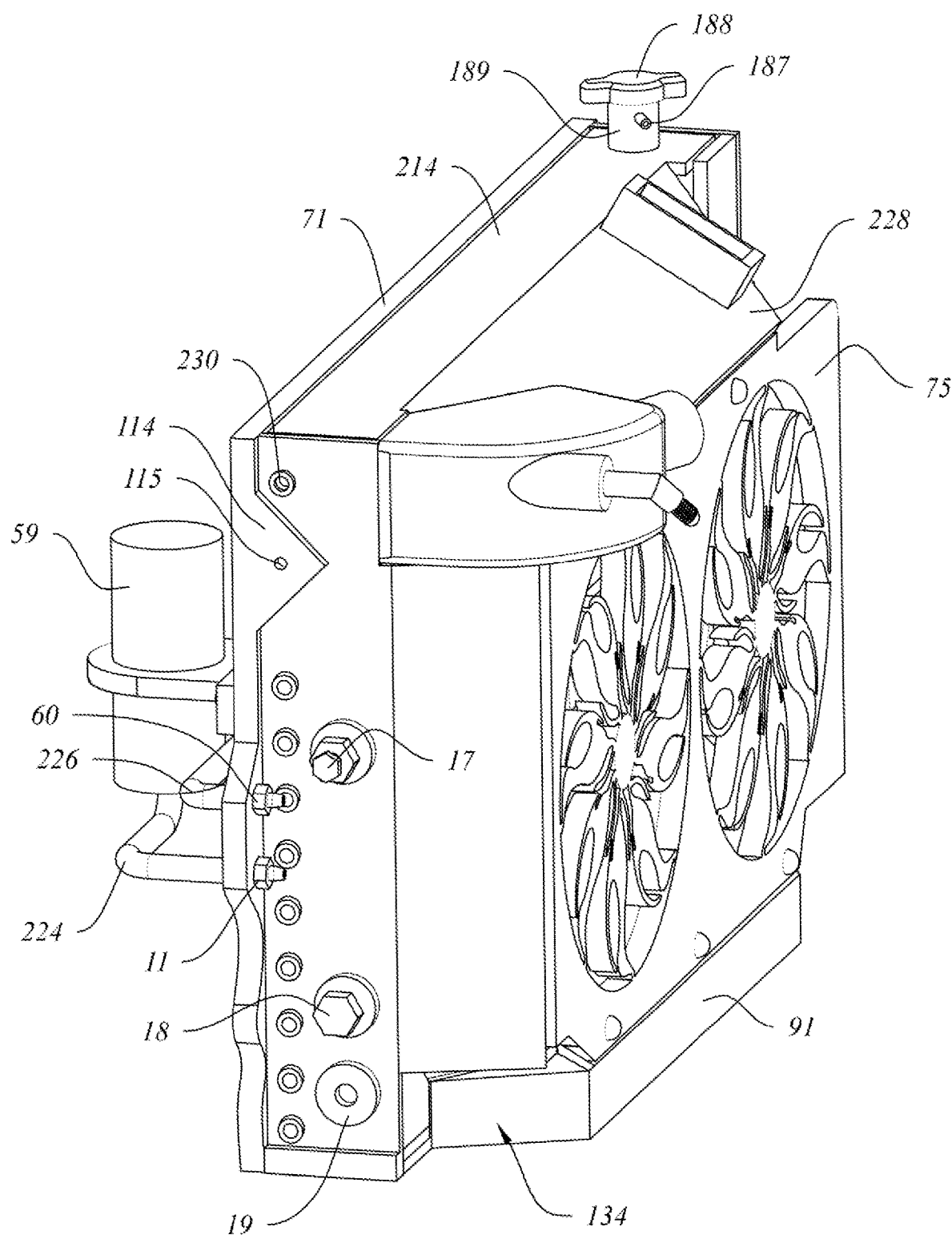
FIG. 6 is a perspective view, showing rear and left sides, of the embodiment of FIG. 4 with the windshield wiper reservoir system removed.

Referring to FIGS. 1-3, mounting frame 70 comprises a substantially rectangular front body 71 with a central aperture 72 to accept placement of decorative front grill 51, an upper bottom support lip 90, a lower bottom support lip 190 (shown in FIG. 12), a rear support lip 91, an upper cover or shroud 14, a right side heat exchange core tank 80 and a left side heat exchange core tank 82. Disposed on a left side of body 71 is a tab 106 comprising power steering inlet aperture 60 and power steering outlet aperture 11. Each aperture 60, 11 is preferably counter-sunk to allow connections fittings, such as jam nuts, to drop into frame 70 for connecting the power steering/hydro-boost reservoir 59. Tab 106 provides strength and aids in eliminating fatigue and leaks to/from the power steering/hydro-boost reservoir 59 that may result from line loosening in the connections to reservoir 59 without tab 106 and apertures 60 (for power steering inlet/return line 226), 11 (for power steering outline line 224). Disposed below left heat exchange core tank 80 is an opening or cavity 134 to provide space for a power steering gear box, as shown in FIG. 6.

Figure 17:
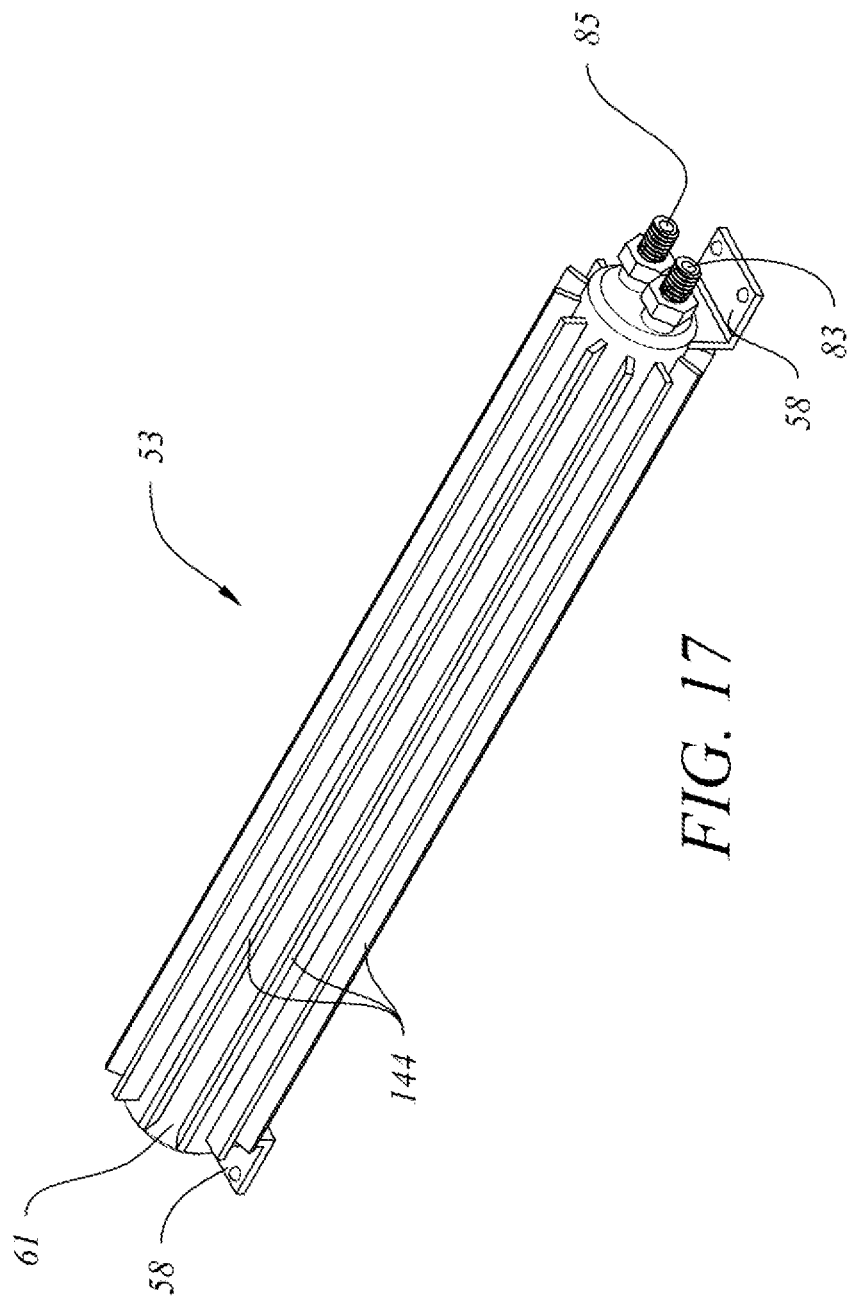
FIG. 17 is a perspective view of a preferred embodiment of an external transmission cooler according to the invention.

Referring to FIGS. 3 and 17, external transmission cooler mounting holes 76 are disposed in bottom support lip 90, preferably near right and left ends of lip 90 under heat exchanger core tanks 80, 82. This placement allows an external transmission cooler 53 to be mounted to frame 70 to maximize space utilization and provide protection by the car frame rails. External transmission cooler 53 preferably comprises a substantially cylindrical tank or body 61 having an inlet 83 and an outlet 85 and a mounting bracket 58 disposed at each end of body 61. Apertures in mounting brackets 58 align with mounting holes 76. Body 61 is preferably divided so that inlet 83 and outlet 85 are on both on a right side of body 61. Extending radially outwardly from cylindrical tank 61 are a plurality of fins 144 to aid in dissipating heat from the transmission fluid passing through body 61. Air circulates around fins 144 to provide cooling. Transmission fluid enters inlet 83 from the transmission and exits through outlet 85 after having been cooled in cooler 53. The cooled transmission fluid is then returned to the transmission, or more preferably is further cooled in internal transmission cooling tube 34 before being returned to the transmission. Cooler 53 is optional, but is preferably included to aid in temperature control particularly under extreme temperatures, during towing or hot weather loads.

Extending rearwardly from bottom support lip 90 are two mounting tabs each with one or more apertures 79 to accept fasteners for mounting an external hydro brake/power steering cooler 78 to frame 70. Mounting tabs with apertures 79 are preferably spaced apart near outer ends of support lip 90. This placement allows a hydro brake/power steering cooler 78 to be mounted to radiator system 110 to maximize space utilization and provide protection by the car frame. Power steering cooler 78 preferably comprises a substantially cylindrical tank or body having an inlet and an outlet 149 and a plurality of fins 148 extending radially outwardly from the body, similar to external transmission cooler 53 (shown in FIG. 17). Fins 148 aid in dissipating heat from the power steering fluid passing through cooler 78. Air circulates around fins 148 to provide cooling. Power steering fluid enters cooler 78 from a power steering gear box (which is positioned in an opening 134 disposed under a left side heat exchange core tank 82), then exits and is sent to power steering reservoir 59. Like transmission cooler 53 (shown in FIG. 17), cooler 78 preferably has an inlet and outlet 149 disposed on the same side of a divided cylindrical body and mounting brackets on each end of the cylindrical body with apertures that are configured to align with apertures 79 in mounting tabs. Cooler 78 is optional, but is preferably included to aid in temperature control particularly under extreme temperatures, during towing or hot weather loads.

Disposed on a rear facing side of frame body 71 are right and left heat exchange core tanks 80, 82. Most preferably, heat exchange core tanks are integrally formed (such as by welding metal parts together) with mounting frame 70 as a single piece in a boxed frame construction to reduce stress and provide structural strength to the tanks 80, 82. In this way, front frame body 71 actually forms a front wall of each tank 80, 82. Right side frame portions (side and rear portions and an inner portion through which vortex tubes 47 are disposed) 81 make up walls of the right side heat exchange core tank 80. Left side frame portions 73 (side and rear portions and an inner portion through which vortex tubes 47 are disposed) make up walls of the left side heat exchange core tank 82. Portions of bottom support lip 90 form the bottoms of tanks 80, 82. Most preferably, a portion of shroud 14 forms the upper wall of both heat exchange core tanks 80, 82. This non-flex construction of frame 70 and heat exchange core tanks 80, 82 has not previously been used in known prior art radiator designs. Left and right lower inner side plates 116 and 119 are connected to frame 70 and heat exchange core tanks 80, 82, preferably by being welded (seamed) to these parts. Inner side plates 116, 119 act as cleats to provide structural integrity and further strengthen the box-style construction. These plates also strengthen the core tanks 80, 82 and reduce the likelihood of core seam fatigue.

Radiator system 110 also preferably comprises a multi-row radiator core heat exchanger comprising a plurality of metal tubes (preferably aluminum) to transfer coolant from the left heat exchange core tank 82 to the right heat exchange core tank 80. The radiator core (not shown) is preferably located in cavity 254 disposed between front grill 51 and fan system housing 56, 68. The radiator core is similar to any standard radiator core, but is preferably sized to fit within cavity 254 and provide sufficient room for air movement. Cavity 254 is preferably around 2-3 inches, and most preferably around 2.5 inches, deep between front grill 51 and rear grill 75, which allows for a fatter radiator core. There is preferably an air gap of around 0.5-1.5 inches, more preferably around 1 inch, between a rear side of front grill 51 and a front side of the radiator core to allow additional room for air circulation entering through front grill 51 and vortex tubes 47. Most preferably, the radiator core is a three or four row core. The radiator core connects in fluid communication to the right heat exchange core tank 80 in the space between walls 81 and above inner side plate 119 (in the opening through which internal transmission cooling tube 34 is visible in FIG. 9). Similarly the radiator core connects in fluid communication to the left heat exchange core tank 82 in the space between walls 73 and above inner side plate 116. The radiator core connects the two heat exchanger core tanks 80, 82, providing fluid tight seals allowing coolant to flow from the left heat exchange core tank 82 through the core tubes to the right heat exchange core tank 80 without leaking into core cavity 254. As an alternative, an inner wall may be provided for each of the core tanks 80, 82 with an aperture near a lower end of the left heat exchange core tank 82 and an aperture near an upper end of right heat exchange core tank 80 to connect to the radiator core tubes. This allows cooler coolant to be pulled from the bottom of the left heat exchange core tank 82 to flow through the core tubes to the right heat exchange core tank 80 and maximizes additional cooling through right heat exchange core tank 80 by heat transfer with the air passing through vortex tubes 47 before the coolant is circulated to the engine.

Figure 4:
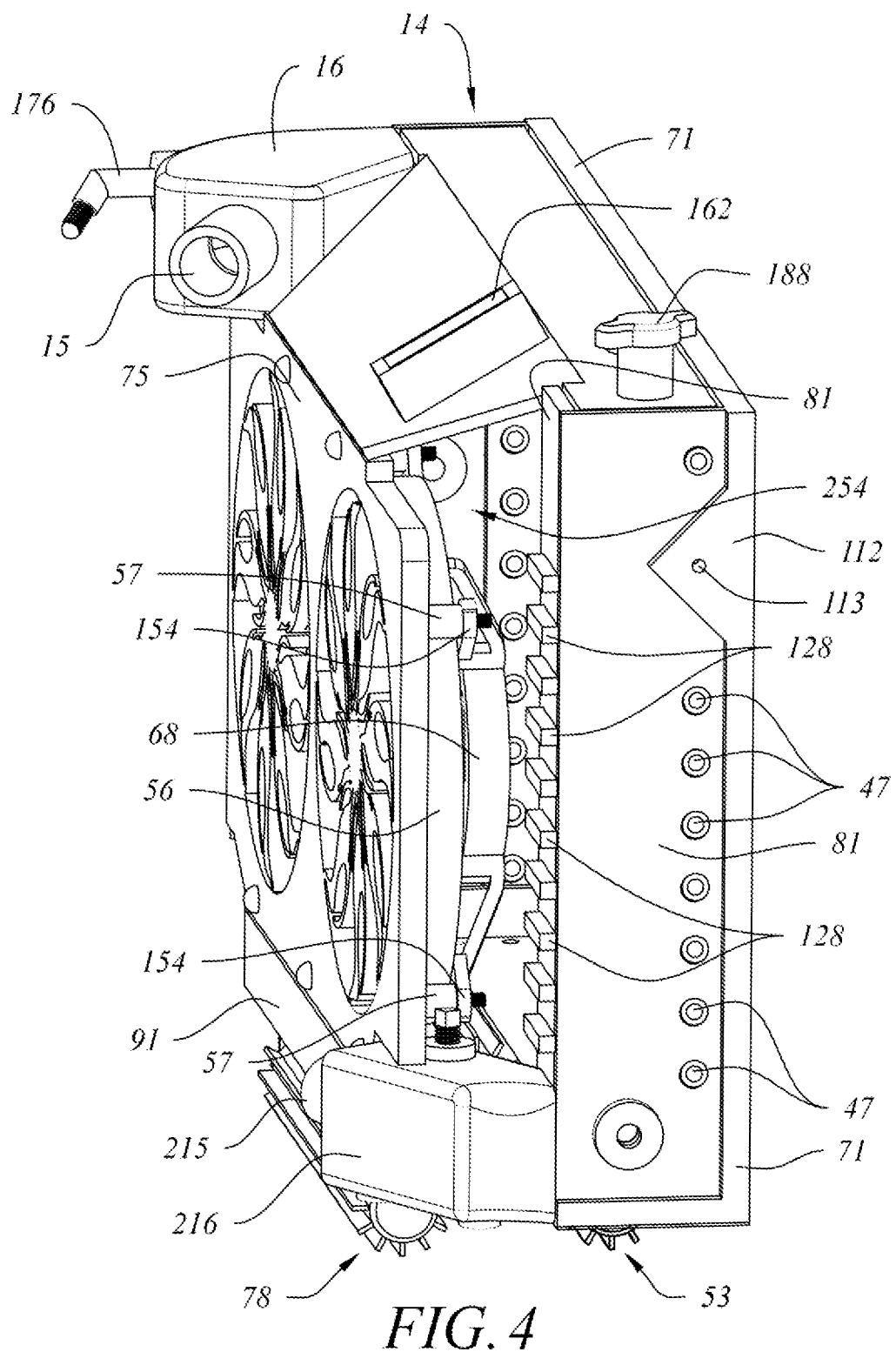
FIG. 4 is a perspective view, showing rear and right sides, of the embodiment of FIGS. 1-2 with the windshield wiper reservoir system removed.
Figure 5:
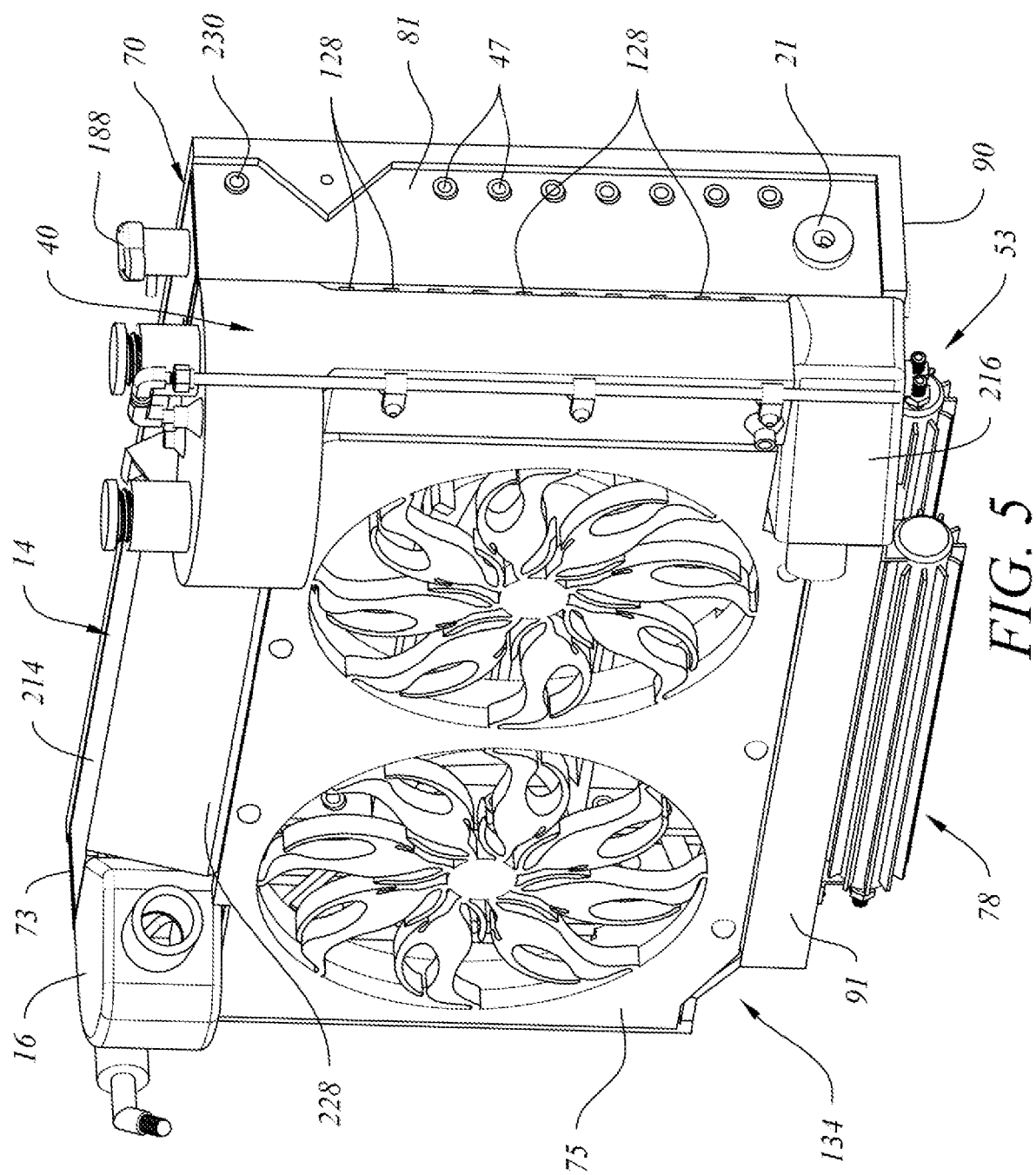
FIG. 5 is a more rotated perspective view of the embodiment of FIG. 4 with the windshield wiper reservoir system included.

Referring to FIGS. 3-5, extending rearwardly from a rear side of right heat exchanger core tank 80 are a plurality of cooling fins 128. Fins 128 are preferably welded onto tank 80, on a rearward facing wall 81. A rear side of windshield wiper tank 25 contacts fins 128 or there may be a small air gap between fins 128 and a rear side of tank 25. An interior edge of windshield wiper tank 25 (and portions of coolant overflow tank 50) are sealed to right heat exchanger core tank 80 to provide an air tight seal on the right side of radiator system 110 for cavity 254 (around the radiator core). But the outside edges are not sealed together (as shown in FIG. 5) to allow air to circulate around fins 128, creating an air vent maze. Air moving through this maze and around fins 128 aids in further cooling coolant in right heat exchange core tank 80. Air moving through this maze around fins 128 preferably does not mix with air inside cavity 254 (which enters through vortex tubes 47 and through apertures 253 in front grill 51). When coolant reaches right side heat exchanger core tank 80, it has already been substantially cooled through the radiator core and will next be sent out of system 110 through lower reservoir outlet 215 to cool the engine. By placing cooling fins 128 in a cooler part of system 110, final cooling of the coolant is enhanced before it is sent to cool the engine.

Disposed below and in fluid communication with right heat exchanger core tank 80 is lower reservoir/manifold 216 having a fluid outlet 215. Fluid outlet 215 is connected to a hose or tubing that allows cooled coolant to flow from lower reservoir 216 to the engine to cool the engine. A drain port and plug 84 are disposed on a bottom side of lower reservoir 216. This port and plug allows coolant to be drained from radiator system 110 when needed for maintenance or coolant flushing. Preferably two wrenches are needed to tighten or loosen the plug to open or close the drain port. This location, near a rear right bottom edge of frame 70, allows coolant to drain without dripping on the frame.

Disposed through a bottom side of frame 70 (through upper and lower bottom support lips 90, 190) are an inlet port 92 and outlet port 93 that allow transmission fluid to flow into and out of internal transmission cooling tubing 34. Internal transmission cooling tubing 34 is disposed inside right heat exchanger core tank 80, in contact with coolant inside tank 80, to provide additional heat exchange between the transmission fluid and coolant Preferably transmission fluid from external transmission cooler 53 enters through inlet port 92 into internal cooling tubing 34. Transmission fluid then exits internal cooling tubing 34 through outlet port 93 and is sent back to the transmission.

Disposed above and in fluid communication with left side heat exchanger core tank 82 is upper reservoir manifold tank 16 having a fluid inlet 15. Fluid inlet 15 is connected to a hose or tubing that allows hot coolant to be returned from the engine to radiator system 110. Fluid inlet 15 is preferably around 1.5 inches in diameter, but other sizes may also be used. Fluid inlet 15 is connected to the engine thermostat housing. Sometimes there is a restriction in coolant returning from the engine to inlet 15 caused by choking; particularly if secondary coolant pumps system 151 is activated resulting in increased volumetric flow rate for the coolant through radiator system 110. Disposed slightly higher on reservoir 16 than inlet 15 is an optional but preferred high volume return port 176 (see FIG. 4), strategically placed higher and behind inlet 15. Return port 176 is connected to the intake manifold of the engine, below the thermostat, and accommodates the additional volumetric flow when the secondary pumps are activated to keep coolant moving through radiator system 110.

Figure 15:
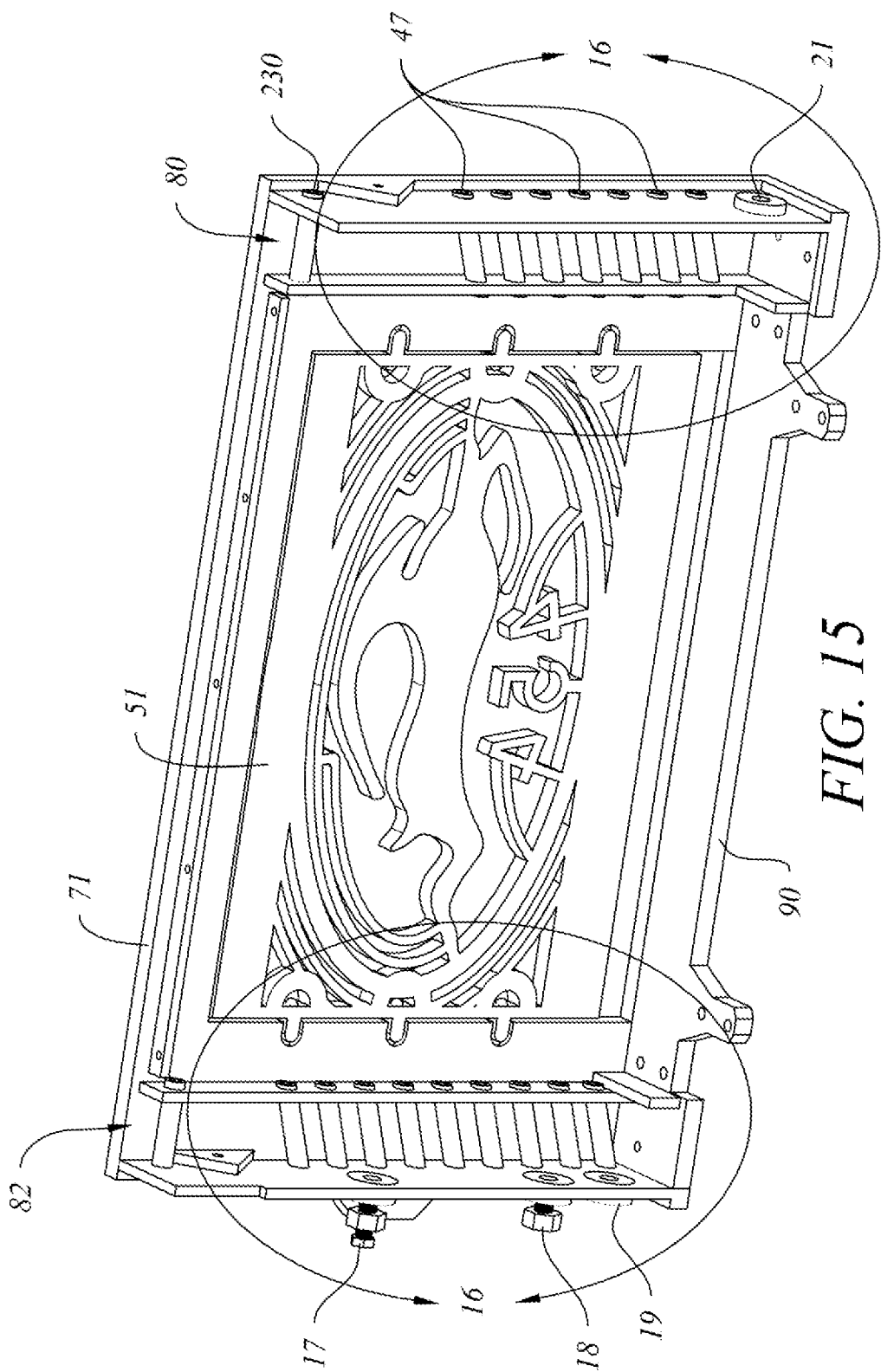
FIG. 15 is a perspective view of the mounting frame of FIG. 3 showing an interior view of preferred embodiments of right and left heat exchange core tanks (with a rear wall removed) and a front grill.

Referring to FIGS. 2 and 15, disposed through an outer sidewall 73 of left side heat exchanger core tank 82 are preferably a high port 17 and a low port 18. These ports are configured to accept a switch or other type of control, measuring, or monitoring device that can send signals or an alarm (such as a flashing light) based on measurement of the coolant inside core tank 82. Port 17 is preferably located in a position that is in the high-mid range of tank 82, between 60-80% of the height of tank 82, most preferably around 75% of the height of tank 82. Port 18 is preferably located in a position that is in the low-mid range of tank 82, between 20-40% of the height of tank 82, most preferably around 25% of the height of tank 82. These ports may be used to insert a temperature sending unit into tank 82 and to send a signal to a control system for radiator system 110 or a relay switch based on the temperature measurement, for example.

Figure 16:
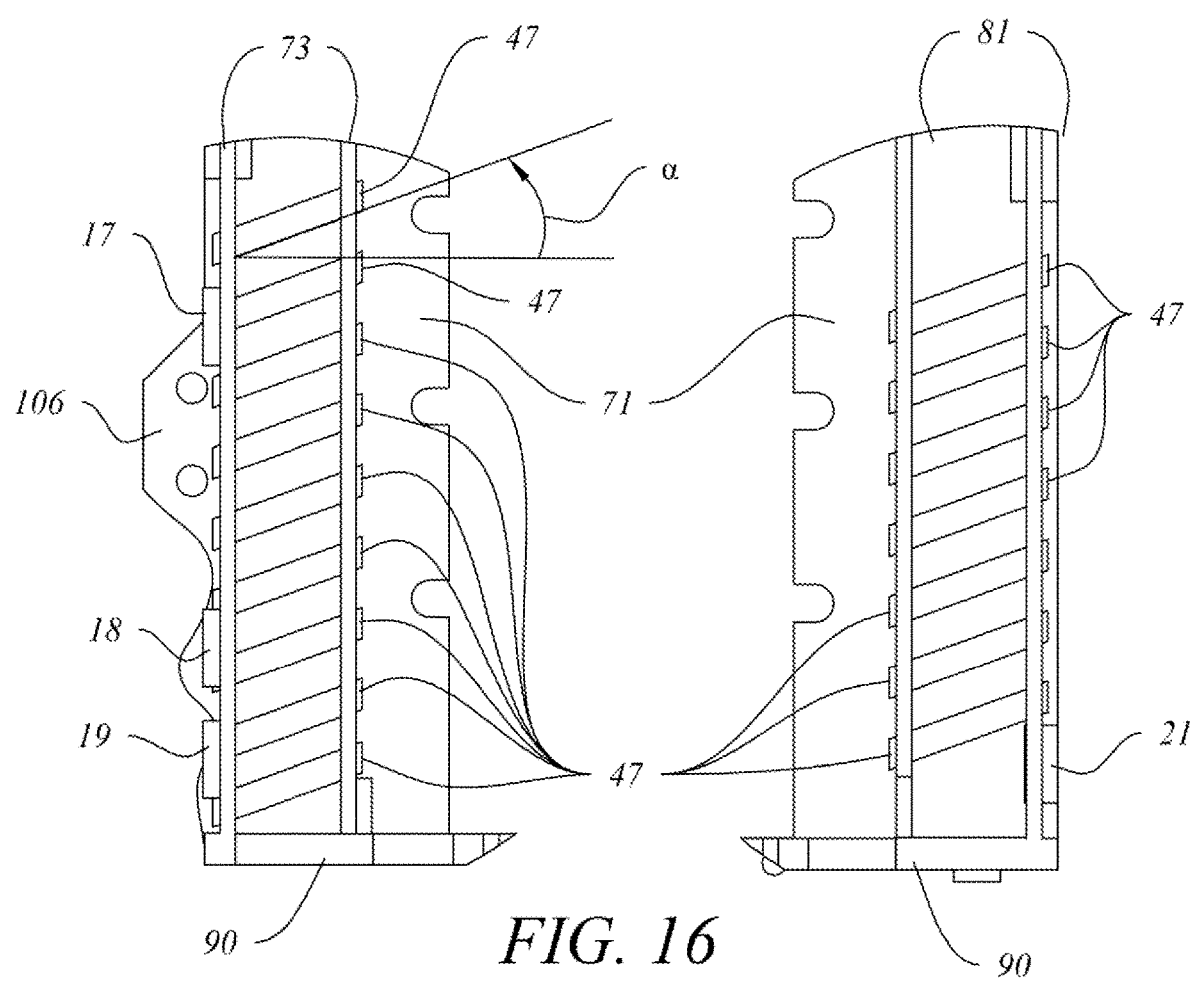
FIG. 16 is an enlarged portion of FIG. 15 showing a preferred embodiment of vortex tubes disposed at an angle α according to the invention.

As shown in FIGS. 3 and 15-16, a plurality of vortex cooling tubes 47 are disposed through right side heat exchange core tank 80 (and frame 70) and through left side heat exchange core tank 82 (and frame 70). Additional vortex tubes 230 are disposed at an upper end of the right and left heat exchange core tanks 80, 82. Vortex tubes 47, 230 are open to the exterior of radiator system 110 and to an interior core cavity 254, allowing air to be pulled in from outside radiator system 110 through the vortex tubes 47, 230 and into cavity 254. Air from tubes 47, 230 enters the area inside frame 70 and around cavity 254. Each tube 47 on a right side of radiator system 110 is angled in a downward direction from the outside of frame 70 toward the inside of frame 70. Each tube 47 on a left side of radiator system 110 is angled in an upward direction from the outside of frame 70 toward the inside of frame 70. The angle of the tubes aids in directing the incoming air into a spinning, circulating pattern to create a vortex of air flow through core cavity 254 to increase cooling as the air passes over and around the tubes in the radiator core. Air also enters through apertures 253 in front grill 51, which intensifies the circular motion of the air in the core cavity 254. Air passing through the length of tubes 47, 230 also acts as a heat exchanger to aid in further cooling the coolant inside the right and left heat exchanger core tanks 80, 82.

Most preferably, each tube 47 is disposed at an angle α between around 20° to 50° relative to a horizontal axis (measured as indicated as will be understood by those of ordinary skill in the art). A wider rectangular shaped radiator system 110 requires a smaller angle and a narrower rectangular shape radiator system 110 requires a greater angle to achieve vortex circulation. An angle of around 44° to 46° would work well for a square shaped frame 70. For a rectangular frame 70 that is around 33-34 inches wide (to fit a core that is around 16 inches high and 26 inches wide), angle α is preferably around 20° to 40°, more preferably around 25° to 35°, and most preferably around 30°. Each tube 47 in any given radiator system 110 is preferably disposed at the same angle α, has the same diameter, and same length as other tubes 47 in that system 110. Most preferably, there are 5-10 tubes 47 on the right side and 5-10 tubes 47 on the left side. Vortex tubes 230 are preferably not angled due to space restrictions, but are otherwise preferably the same size as vortex tubes 47.

Disposed through an outer sidewall and inner side wall of left side heat exchanger core tank 82 is a zinc plug hole 19 (shown in FIG. 6). A similar zinc plug hole 21 is disposed through an outer sidewall and inner side wall of right side heat exchanger core tank 80 (shown in FIG. 5). Each zinc plug hole 19, 21 is preferably disposed at the bottom of tanks 80, 82 below vortex cooling tubes 47. Each zinc plug hole 19, 21 is configured to accept a zinc plug (typically around 3 inches long) that is inserted into tank 80, 82 to aid in minimizing the detrimental impact of electrolysis on aluminum parts of radiator system 110. The zinc plugs may be removed and replaced as needed. To further minimize electrolysis, frame 70 is grounded by connecting weight stabilizing bars 77 near upper and lower ends of a front (interior) face of rear grill 75 to grounding straps 62 that are connected to isolator ears 154 on fan housing 56 (shown in FIG. 12). This allows all aluminum components to be grounded together. Similar grounding for aluminum parts may be located elsewhere in radiator system 110. Grounding may also be provided for electrical parts within radiator system 110.

Referring to FIG. 1, a power steering/hydro-boost reservoir 59 is preferably mounted to frame 70 and decorative front grill 51 using mounting holes 55 and 96 and mounting transference bar 94. This mounting placement allows heat to transfer to grill 51, which absorbs and dissipates the heat. This mounting placement also provides other advantages. Typically, a power steering reservoir would be mounted to an inner fender, requiring holes in the inner fender to run fluid lines from the reservoir to the radiator. It is not desirable to have holes in an inner fender, particularly on the chassis of a classic vehicle. By mounting reservoir 59 to frame 70, no holes in an inner fender are required for running lines to radiator system 110. Most preferably, reservoir 59 is mounted near an upper end on a front left side of frame 70, which also elevates the reservoir relative to a typical location for a power steering pump to which reservoir 59 would be connected.

Figure 14:
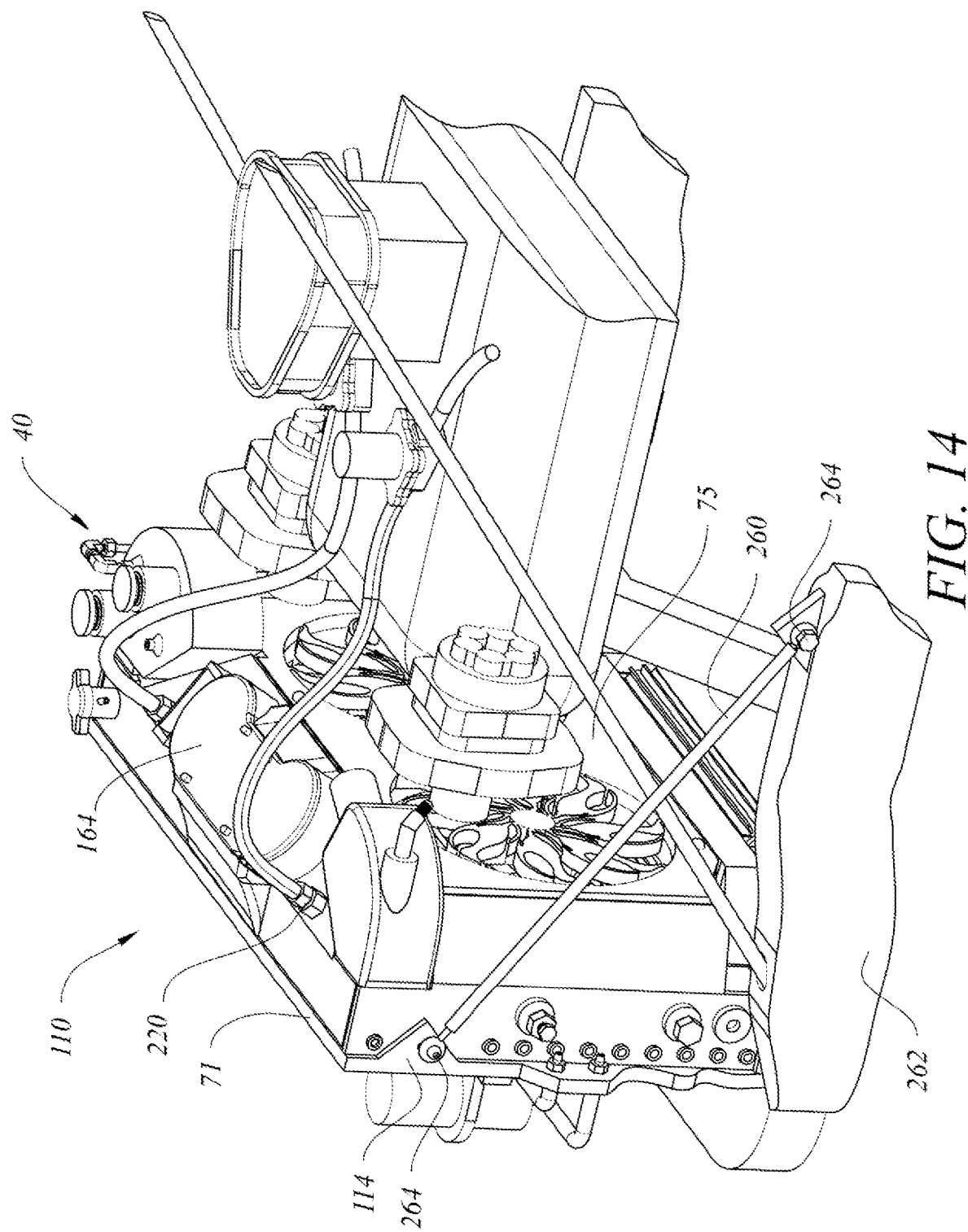
FIG. 14 is a more rotated perspective view of the embodiment of FIG. 12 as shown installed in an exemplary vehicle, with a portion of the engine compartment and vehicle frame depicted.

Radiator system 110 also preferably comprises a frame mounting system comprising diagonal support bars and mounting isolators. Referring to FIG. 14, diagonal support or mounting bars 260 are connected to frame 70 at right and left side mounting blocks 112, 114 and extend rearwardly and diagonally downwardly from body 71. Mounting blocks 112, 114 extend outwardly from right and left side frame pieces 73 and 81 of mounting frame 70, effectively making right and left side frame pieces 73 and 81 thicker and reinforced in the area of mounting blocks 112, 114. Most preferably, mounting blocks 112, 114 are integrally formed with (or welded to) mounting frame 70, are disposed near an upper end of frame 70, and are cantilevered past heat exchange core tanks 80, 82 (without protruding into tanks 80, 82) to allow for sufficient clearance of the diagonal support bars. As shown in FIGS. 4 and 6, each mounting block 112, 114 comprises an aperture 113, 115 allowing connection to a diagonal support bar. By being in contact with heat exchanger core tanks 80, 82, mounting blocks 112, 114 and the connected support bars 260 also aid in the cooling function of radiator system 110 as heat may be extracted through apertures 113, 115 and the support bars. Most preferably diagonal mounting bars 260 comprise turn-buckle adjustable bars configured to fit to the vehicle frame 262 and frame 70 of radiator system 110 to avoid body twisting and are connected to mounting blocks 112, 114 and to tabs on the vehicle frame using hyman joints. Using mounting blocks 112, 114, turn-buckle mounting bars, and hyman joints 264 allow for fine adjustment in positioning radiator system 110 in the motor compartment of an automobile when clearance around other parts may be tight. Mounting blocks 112, 114 also aid in preventing binding and eliminating stress and fatigue on the radiator. The adjustability mechanism allow for fine tuning the placement of radiator system 110 up to 3 degrees in each direction at the final installation stage for the best possible fit. The distal end of each support bar may be connected to the frame of the vehicle.

In addition to diagonal mounting bars, a frame mounting system preferably comprises right and left mounting isolators to connect radiator system 110 to a vehicle. Mounting isolators are preferably substantially cylindrical with a threaded post extending from an upper and lower end of each isolator. Each upper threaded post is configured to mate with a threaded slot or hole 74 on a bottom surface of bottom support lip 90 under the right and left heat exchange core tanks 80, 82 to allow the isolators to be mounted to the bottom of tanks 80, 82. The bottoms of each tank 80, 82 provide a dome area for the receiving slot, which allows for more threads on the posts to provide stronger attachment for the mounting isolators and to conceal the posts. The threaded posts preferably do not extend into tanks 80, 82, which are sealed to be fluid-tight. Alternatively, a threaded post may extend from a bottom of each tank 80, 82 and be configured to mate with a threaded slot disposed inside a body of each mounting isolator. Each lower post is configured to mate with a threaded slot or hole on a standard (original) radiator support bracket of the vehicle in which radiator system 110 is being installed. Each mounting isolator is preferably and made from heavy duty vulcanized rubber to minimize vibrations and rattle. A custom made cross member and also be used to accept isolators to allow radiator to drop deeper into car frame rails.

Figure 8:
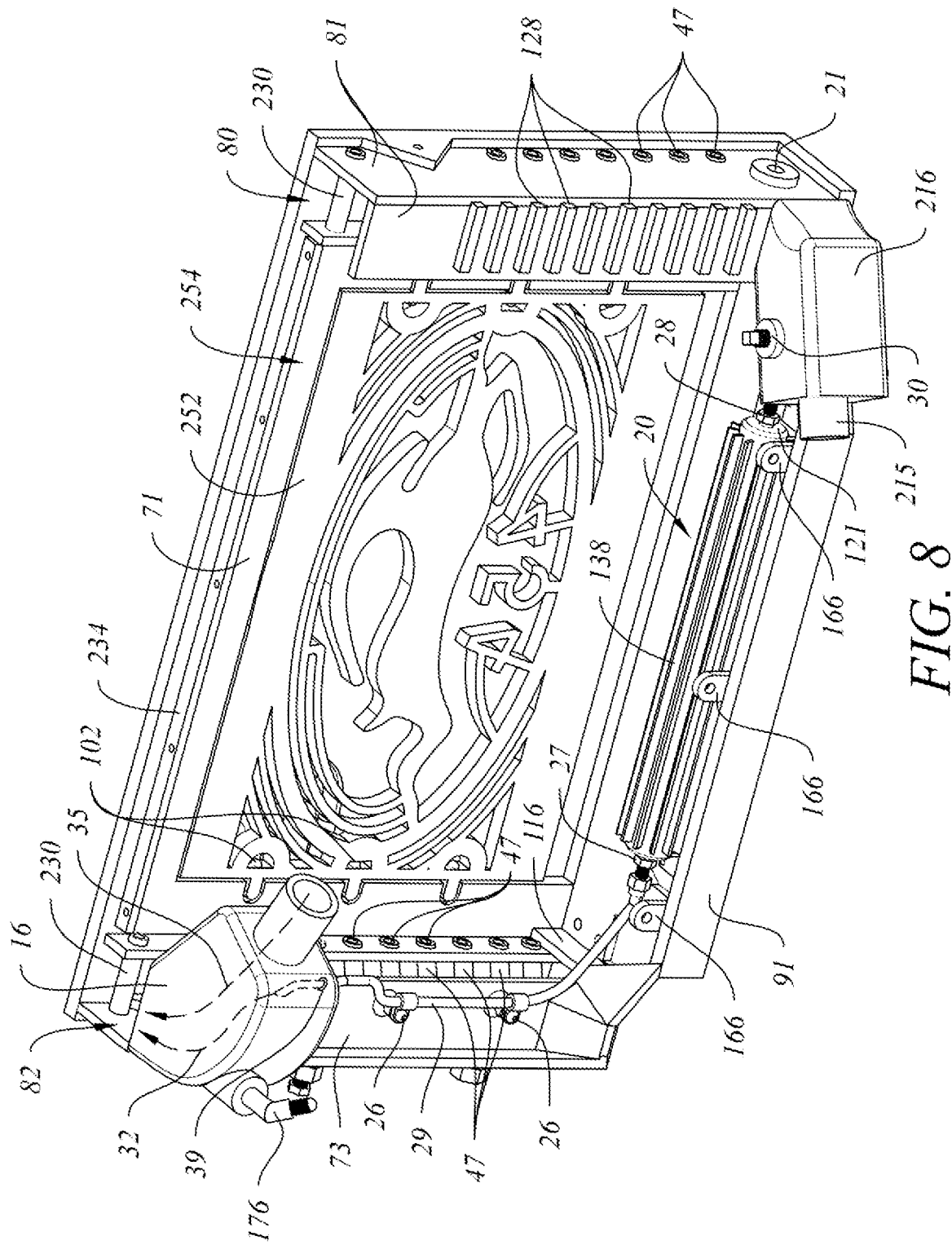
FIG. 8 is a perspective view of the mounting frame of FIG. 3, showing a top, right exterior side, and left interior side, with preferred embodiments of a front grill and a self-circulating cooling system (FIG. 10) installed.

Referring to FIGS. 1 and 8, decorative front grill 51 preferably comprises a frame portion 252 and a plurality of apertures 253 disposed through the frame portion 252. The apertures 253 in front grill 51 are preferably configured into a personalized design or provide information or a design regarding the make, model, or year of the automobile in which radiator system 110 will be installed. Other personalized information, such as the name of the automobile owner, may also be used. The personalized information or design is preferably cut into the metal grill frame portion 252 and is formed by apertures 253. Any pattern may be used for apertures 253 and it is not necessary that they form a personalized design. Front grill 51 also serves to protect interior portions of system 110 (particularly the radiator core from debris that may be sucked in with the air flow through the front grill 51) and to control the flow of air so that it flows in a counterclockwise direction (when viewed from the front of grill 51) between front grill 51 and the core.

The frame portion 252 of decorative front grill 51 is preferably substantially rectangular and configured to fit within aperture 72 of mounting frame 70. Other shapes may also be used for grill 51 and aperture 72. Most preferably, an inner edge of aperture 72 and an outer edge of front grill 51 comprise a plurality of slots 98 and tabs 100 that are configured to engage with each other and allow grill 51 to be securely fastened to mounting frame 70 through fasteners, such as with a screw inserted through an engaged slot-tab pair. Most preferably each slot-tab pair 98, 100 are configured to interlock to provide a flush front surface where frame 70 and grill 51 meet. Even more preferably, each slot-tab pair 98, 100 are configured to interlock to also provide a flush rear surface where frame 70 and grill 51 meet. A set screw 102 may be placed through an opening 253 in grill into a slot-tab pair as shown in FIG. 8. The slot-tab pairs also aid in allowing heat to transfer to grill 51 and dissipate.

Figure 12:
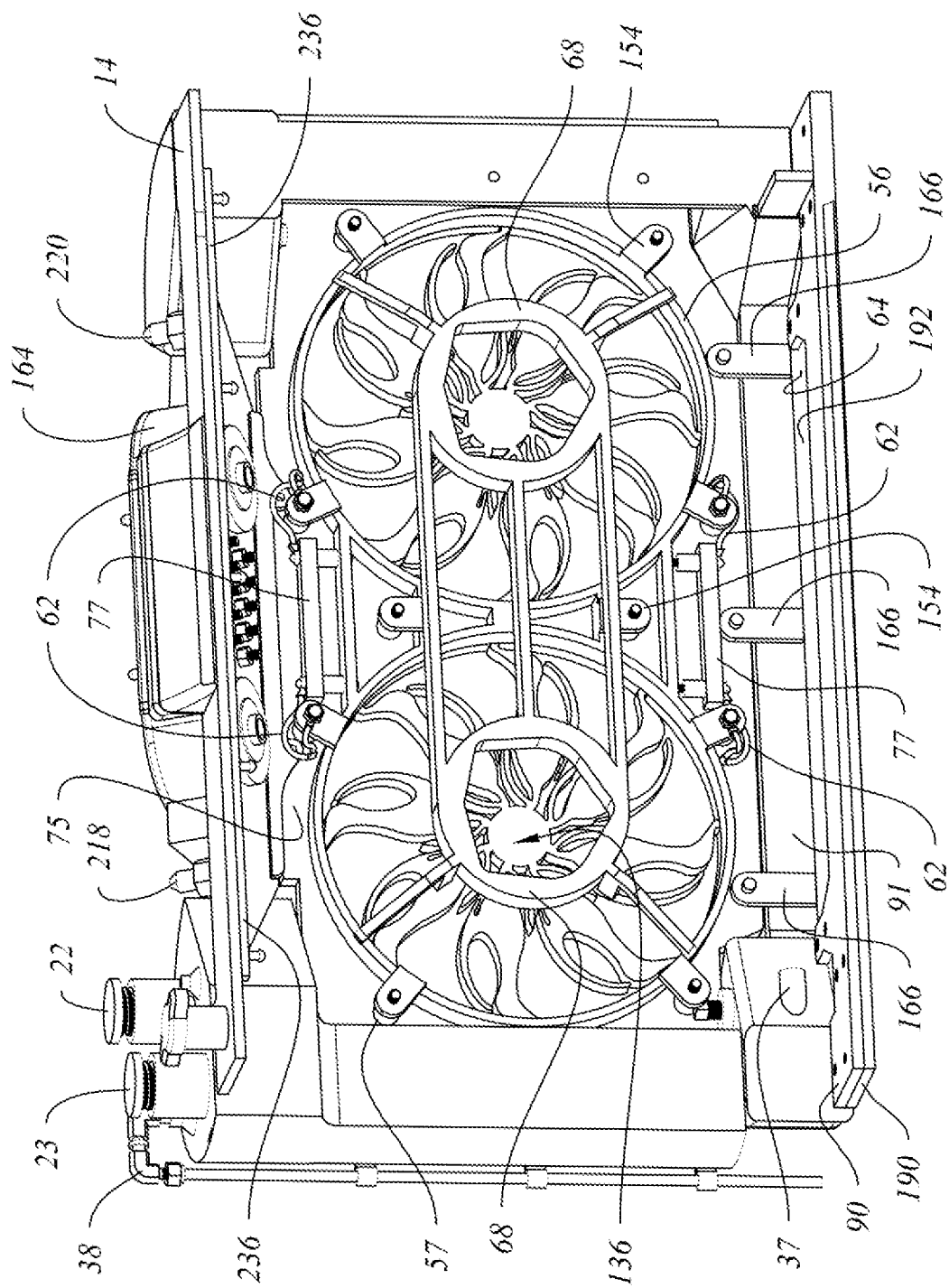
FIG. 12 is perspective view, showing an interior view from the front of the fan housing of FIG. 11 installed in a preferred embodiment of a mounting frame and showing a preferred embodiment of an optional secondary coolant pumping system.

Referring to FIGS. 2 and 12, rear fan grill 75 is disposed on a rear side of radiator system 110. Rear fan grill 75 serves as an exhaust port for air circulating through radiator system 110 and aids in directing air flow to prevent pull-back which would cause fans in an internal fan system to work harder. Most preferably, rear grill 75 is personalized with information or a design, similar to front grill 51. The personalized information or design is preferably cut into the metal grill to crate apertures 253 through which air can flow. A personalized design is not required for rear grill 75, provided that apertures 255 through rear grill 75 are present to allow air to flow through. Most preferably, the area in which apertures are located are sized to conform to the size and shape of primary fan housing 56 (fan blade housing). Generally, this area will be circular and sized with a slightly smaller diameter than the diameter of primary fan housing 56 to match the diameter of the fan blades disposed in front of each rear grill aperture area, to aid in directing air through rear grill 75. Rear grill 75 is preferably substantially rectangular and connects to rear support lip 91 on a lower side, upper cover or shroud 14 on an upper side, windshield washer fluid reservoir system 40 on a right side, and left heat exchange core tank 82 on a left side. Most preferably, rear grill 75 is connected using mounting holes 167 to mounting tabs 166 on rear support lip 91 of frame 70 (shown in FIGS. 8 and 12). An upper edge of mounting tabs 166 extends upwardly from a top edge of rear support lip 91 of frame 70. Using mounting holes 237, rear grill 75 is attached to apertures in mounting bar 235 on upper cover 14 (shown in FIG. 13B). Rear grill 75 also preferably acts as a fan blade guard and aids in dissipating heat from internal components of radiator system 110. Rear grill 75 may be removed from radiator system 110, to allow access to an internal fan system and other internal components of radiator system 110.

Figure 11:
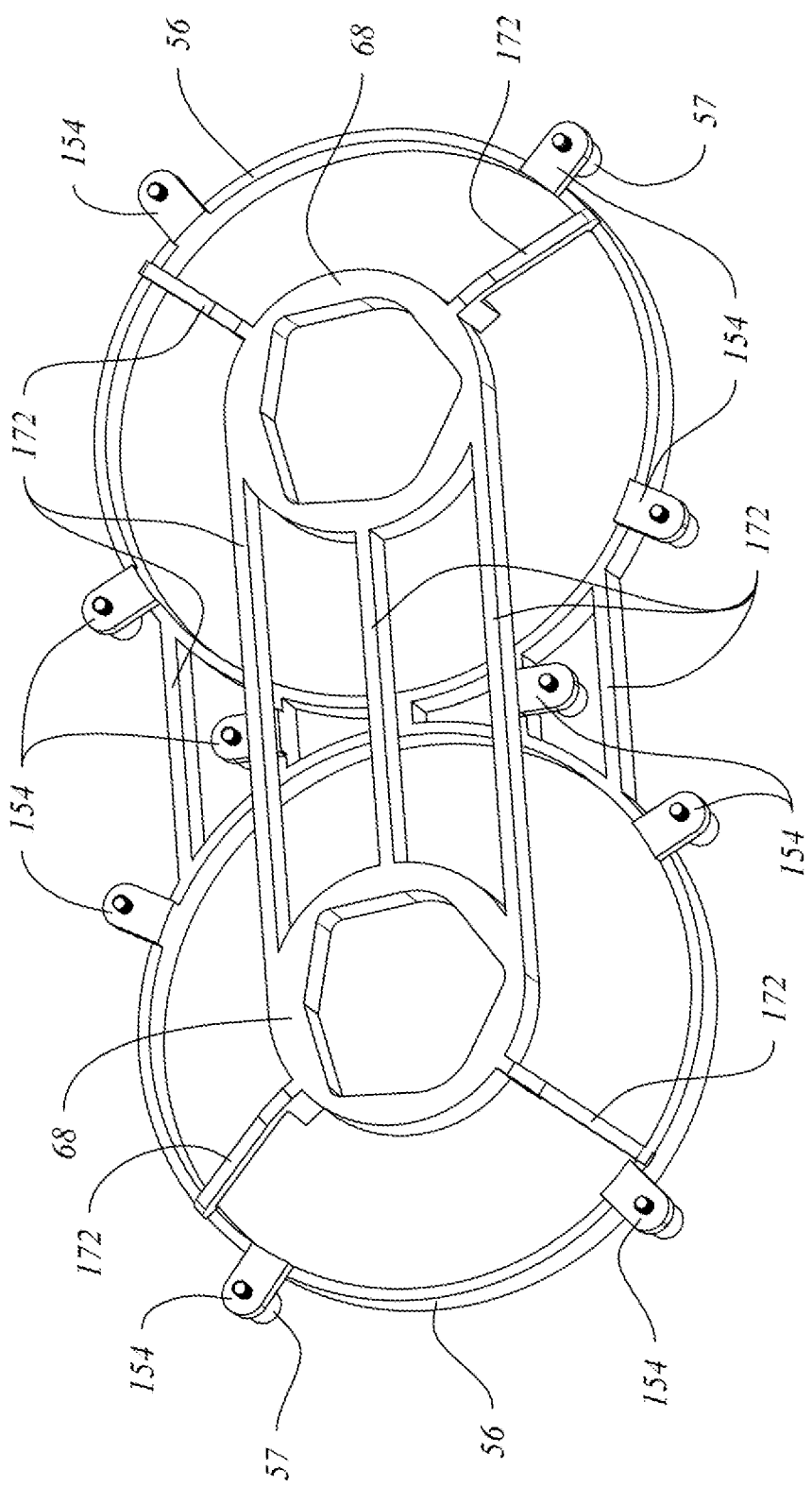
FIG. 11 is a perspective view of a preferred embodiment of a fan housing system according to the invention.

Referring to FIGS. 4, 11, and 12, an internal fan system is preferably disposed in front of rear grill and behind the radiator core in internal cavity 254. For each fan used, a fan system preferably comprises a primary housing 56, a plurality of isolator ears 154, a secondary housing 68, and connecting ribs or support bars 172 to connect primary housing 56 to secondary housing 68. Primary housing 56 is configured to receive the blade portion of a fan and secondary housing 68 is configured to receive the motor portion of the fan in a central opening 136. At least one and preferably two fans (not shown, for ease of viewing) are used with a fan system for radiator system 110. An internal fan system is preferably capable of generating air flow of around 2600 to 5200 CFM (or more) through core cavity 254. Most preferably there are two fans in internal fan system, each capable of air movement of around 2000-3000 CFM, and more preferably around 2600 CFM each. Most typical radiators use externally mounted fans (not inside of a radiator frame like radiator system 110) that are only capable of around 1800-2200 CFM maximum. An internal fan system in radiator system 110 is capable of much high air flow rates. Most preferably, housing 56 and 68 are made from aluminum and are connected together by support ribs 172. A plurality of isolator ears 154 are disposed around a perimeter of primary housing 56 and spaced apart on ribs 172. An internal fan system is secured in radiator system 110 by connecting an isolator 57 to each isolator ear 154, so that fan housing 56 essentially floats in front of grill 75. Each isolator 57 is connected to an interior side of rear grill 75 and fan housing 56. An upper and lower weight stabilizing bar 77 is disposed on a front (interior) side of rear grill 75. The upper bar 77 acts to lift weight up through isolators 154, while the lower bar 77 pushes weight up through isolators 154. Most preferably, there is little clearance between rear grill 75 and primary fan housing 56, which aids in moving air out of grill 75. When the internal fan system is running, the fans pull air through vortex tubes 47 and through apertures 253 in front grill 51, over and around radiator core and internal parts within core cavity 254, and out through rear grill 75.

With air being pulled from front to rear through radiator system 110, a vacuum is created at an inner edge of vortex tubes 47, pulling air in through the tubes 47 and changing the direction of air into a circular motion through radiator core and creating more turbulence inside core cavity 254 to extend the length of time the air circulated through the core before exiting through rear grill 75. This air circulation pattern inside cavity 254 prolongs the amount of time air is inside cavity 254 and in contact with the core. For example, instead of air moving essentially straight in and straight out of a typical prior art radiator in about 0.7 seconds, the air inside core cavity 254 spins around as it travels through core cavity 254, remaining inside core cavity for around 6 seconds before exiting through rear grill 75. The additional time air is inside core cavity 254 and the additional distance the air travels, maximizes the efficiency in heat transfer between the core and air (and other components, such as self-circulating cooler system 20 and the air). The air exiting through rear grill 75 is significantly hotter than air exiting a typical prior art radiator core. Additionally, parts of the frame 70 (including cover 14 and right and left heat exchange core tanks 80, 82), front grill 51, rear grill 75, and windshield wiper reservoir system 40 are preferably sealed together (preferably welded) to provide an outer shroud around a sealed inner core cavity 254. This prevents air from leaking into or out of cavity 254 other than through vortex tubes 47, apertures 253 in front grill 51 and apertures 255 in rear grill 75, where air is supposed to enter and exit radiator system 110. Welding these parts together also aids in strengthening and stabilizing radiator system 110. Prior art radiators do not have a sealed air cavity for directing air flow through the core, which allows air to enter from the wrong side forcing the fans and cooling system to work harder and be less efficient.

Figure 9:
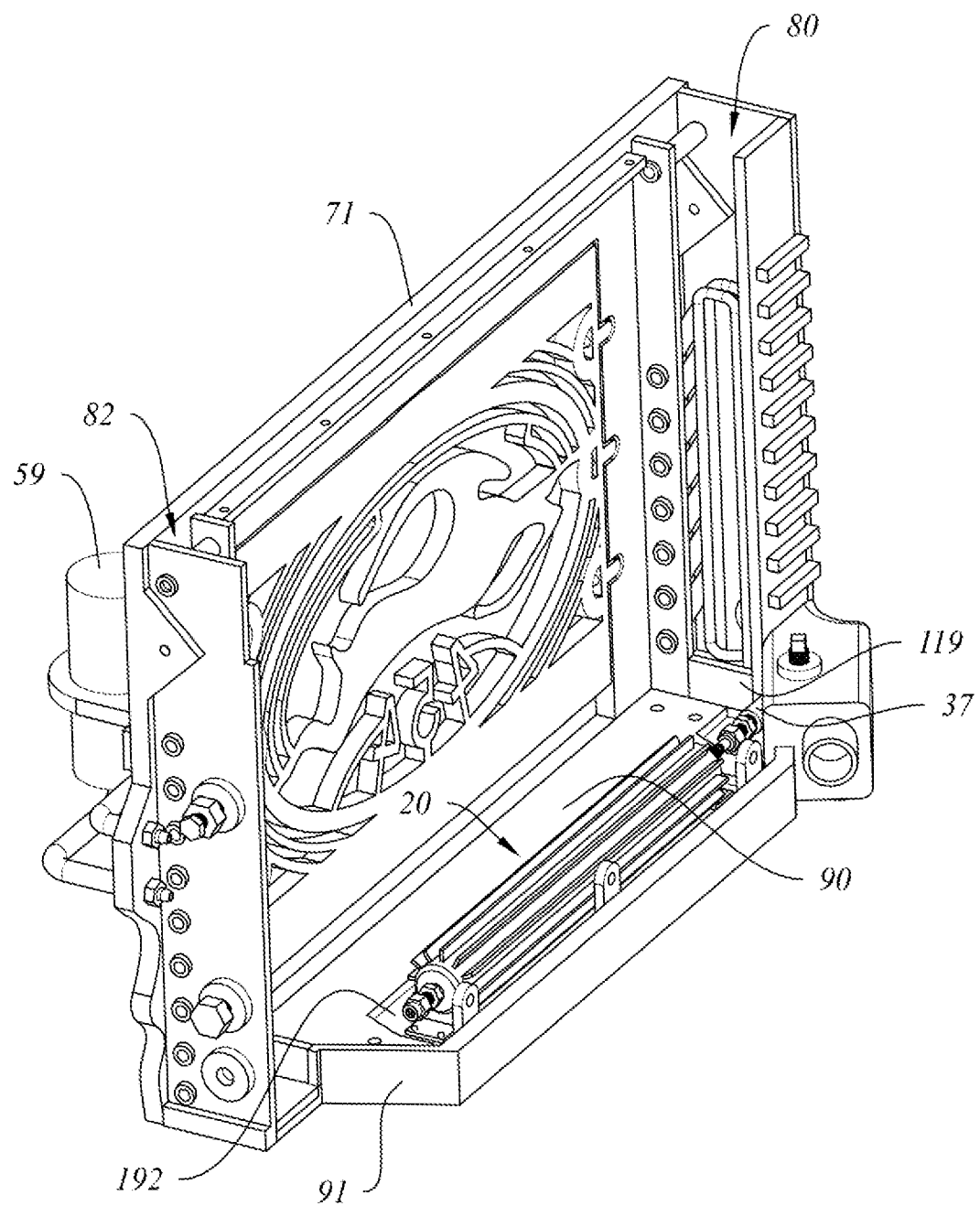
FIG. 9 is a perspective view of the embodiment of FIG. 8 rotated to show the right interior side and left exterior side.
Figure 10:
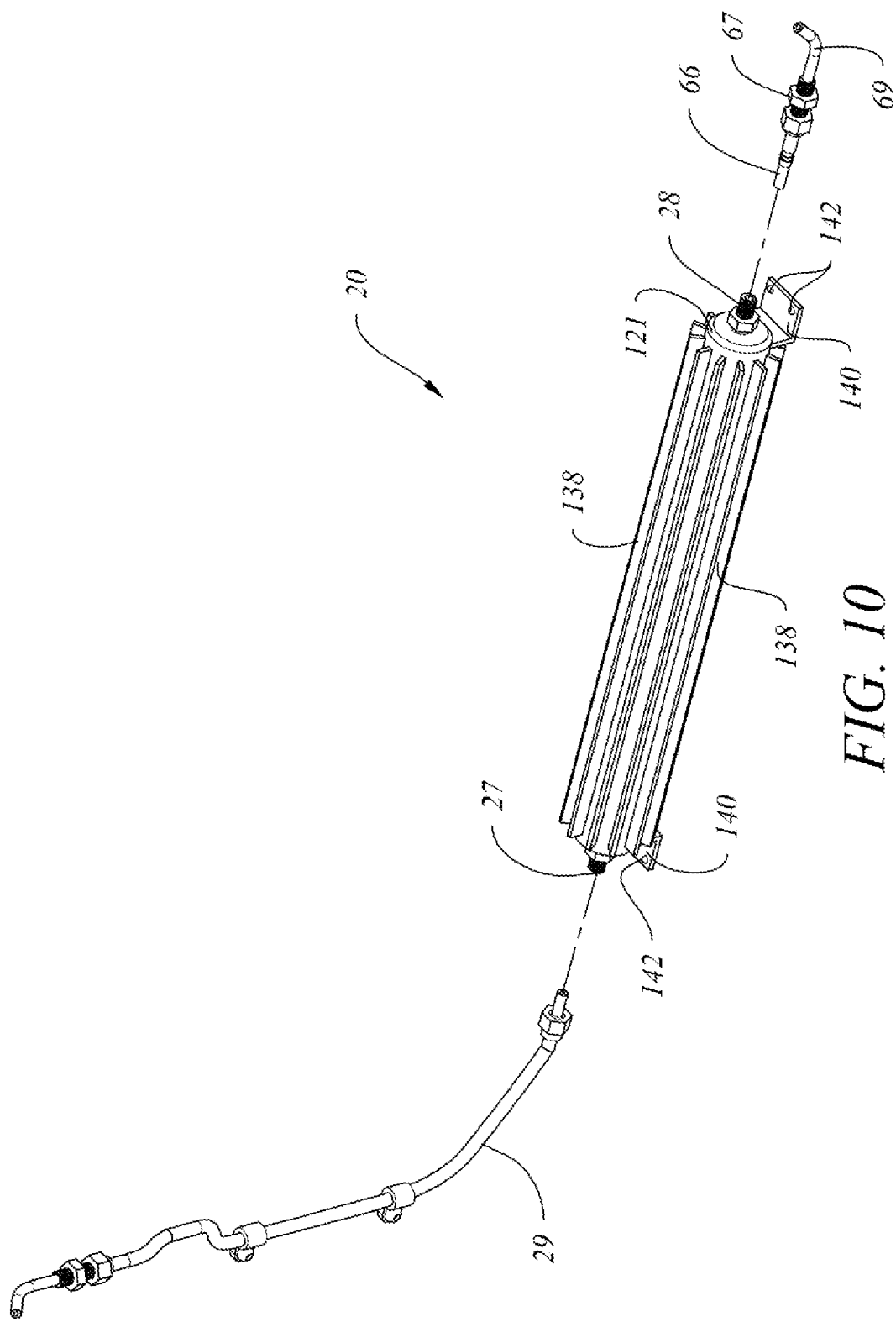
FIG. 10 is a perspective exploded view of a preferred embodiment of a self-circulating cooling system according to the invention.

Referring to FIGS. 8-10, self-circulating cooling system 20 is another heat exchanger that is preferably disposed substantially inside frame 70, between front grill 51 and rear grill 75. Self-circulating cooling system 20 uses a percolation effect to create passive energy to move hot coolant up and with that be able to circulate coolant using this energy, similar to a coffee machine percolator. Self-circulating cooling system 20 preferably comprises a substantially cylindrical tank or body 121 having an inlet 28 and an outlet 27, a rise tube 29 connected in fluid communication with outlet 27, and an inlet tube 66 connected in fluid communication to inlet 28. Body 121 is preferably disposed under fan housing 56, 68, in a slightly recessed area 192 formed between lower bottom support lip 190 and upper bottom support lip 90 (best seen in FIGS. 9 and 12). Extending radially outwardly from cylindrical tank 121 are a plurality of fins 138 to aid in dissipating heat from the coolant passing through body 121. Air pulled into radiator system 110, preferably in a vortex, circulates around fins 138. Tank 121 acts as a heat exchanger, where coolant passes through body 121 and heat is dissipated through fins 138. Disposed at each end of body 121 is a mounting bracket 140, each with one or more apertures 142 to allow connection of body 121 to frame 70. Referring to FIG. 12, apertures 64 in lower bottom support lip 190 allow connection of body 121 to frame 70. Although not visible in FIG. 12, additional apertures 64 are disposed on the right and left sides of lower bottom support lip 190 to align with apertures 142 in mounting brackets 140.

Tube 66 is connected in fluid communication to lower reservoir manifold tank 216 and to inlet 28 to allow coolant to flow from lower reservoir tank 216 into tank 121. Connector 67 connects tube 66 to outlet 37 on lower reservoir manifold tank 216. Tube 66 preferably has an end 69 disposed at an angle so that tube 66 is inserted through port 37 and extends into right heat exchange core tank 80 through a rear side of tank 216. This allows a portion of coolant from the bottom of right heat exchanger 80 to be diverted to self-circulating cooling system 20 through outlet 37 and another portion of coolant from lower reservoir tank 216 to be sent to cool the engine through outlet 215.

A tube 29 is connected in fluid communication to upper reservoir tank 16 and outlet 27 to allow coolant to pass into upper reservoir tank 16 after being cooled in tank 121. Connector 31 connects tube 29 to port 39, located on a bottom side of reservoir 16, allowing an upper curved portion of tube 29 to extend into reservoir 16 (shown as dashed lines in FIG. 8). Tube 29 is shaped and oriented with respect to cooling system 20 and upper reservoir tank 16 to create a syphon effect when coolant is being returned to tank 16 through inlet 15 or 176. An outlet end of tube 29 is preferably disposed at an angle between 45° and 90° relative to a longitudinal axis of a central portion of tube 29 and is turned to face away from tank 121 and pointed in a direction toward a rear outer corner of reservoir 16. A direction of fluid flow from tube 29 is shown by arrows 32 in FIG. 8. A direction of fluid flow in through inlet 15 is shown by arrows 35 in FIG. 8.

An inlet end of tube 29 is preferably disposed inside tank 121 and bent at an angle to be directed toward the top half of cylindrical tank 121 (the top half being that portion above an axis extending from inlet 28 to outlet 27 when tank is substantially horizontal). This allows tube 29 to pull from the top of tank 121, where coolant is the hottest and wants to move in an upward direction toward reservoir tank 16. With the engine running, water being pulled from engine water pump through 215 forces water through tube 66, pushing water through self-circulating cooler 20 and through tube 29 to upper intake manifold 16 creating a water shock without the fans running, eliminating the fans running, keeping water cool also being assisted by the inlet water creating a self-cooling system. This also aids in creating a syphoning effect through tube 29 by pulling coolant from the high side of the self-circulating cooling system 20 heat exchanger by being placed inside tank 121 with an open end of tube 29 pointing up so it only pulls from a high (top) side of tank 121. Tube 29 is mounted to an exterior surface of heat exchange core tank 82 by mounting tabs 26 (welded on barrel nuts). The shape and configuration of tubes 29 and 66 also aid in preventing coolant from flowing in the wrong direction through self-circulating cooling system 20 and reservoirs 16 and 216. Air circulating inside radiator system 110 passes over tube 29 to provide additional heat exchange and cooling for coolant in the tube.

The coolant in lower reservoir 216 has already passed through the radiator core and been cooled compared to the coolant in upper reservoir 16 (having been returned from cooling the engine through inlet 15 and/or return port 176). Coolant is pushed through self-circulating cooling system 20 by the engine water pump when coolant is being pumped through outlet 215 on lower reservoir tank 216 (and it is not necessary for the fans to be running). Coolant passes through self-circulating cooling system 20 from reservoir 216 to upper reservoir 16 to cool the coolant further. This allows the coolant entering reservoir 216 from cooling system 20 to be at the lowest temperature of all the coolant in radiator system 110, where it mixes with the hottest coolant in radiator system 110 inside reservoir 16. This drastic temperature difference shocks the hottest coolant in reservoir 16 to dramatically drop the temperature of the coolant in reservoir 16 prior to entering the radiator core for additional cooling. This temperature differential also aids in passively self-circulating coolant through self-circulating cooling system 20, even when the car engine is off and the radiator system 110 is still pressurized. The coolant then cycles through the core, to the right side heat exchanger core tank 80, through reservoir 216 and portion goes back through self-circulating cooling system 20 (with another portion passing through outlet 215 to cool the engine). By cycling coolant through self-circulating cooling system 20, radiator system 110 operates more efficiently and saves wear and tear on the fans in the internal fan system. Self-circulating cooling system 20 may also be used with standard vehicle radiators by connecting tubes 66 and 29 to the heat exchange core tanks in a manner similar to that described with radiator system 110 and with modifications to the standard radiator core tanks to allow fluid communication with self-circulating cooling system 20 as will be understood by those of ordinary skill in the art.

Figure 7:
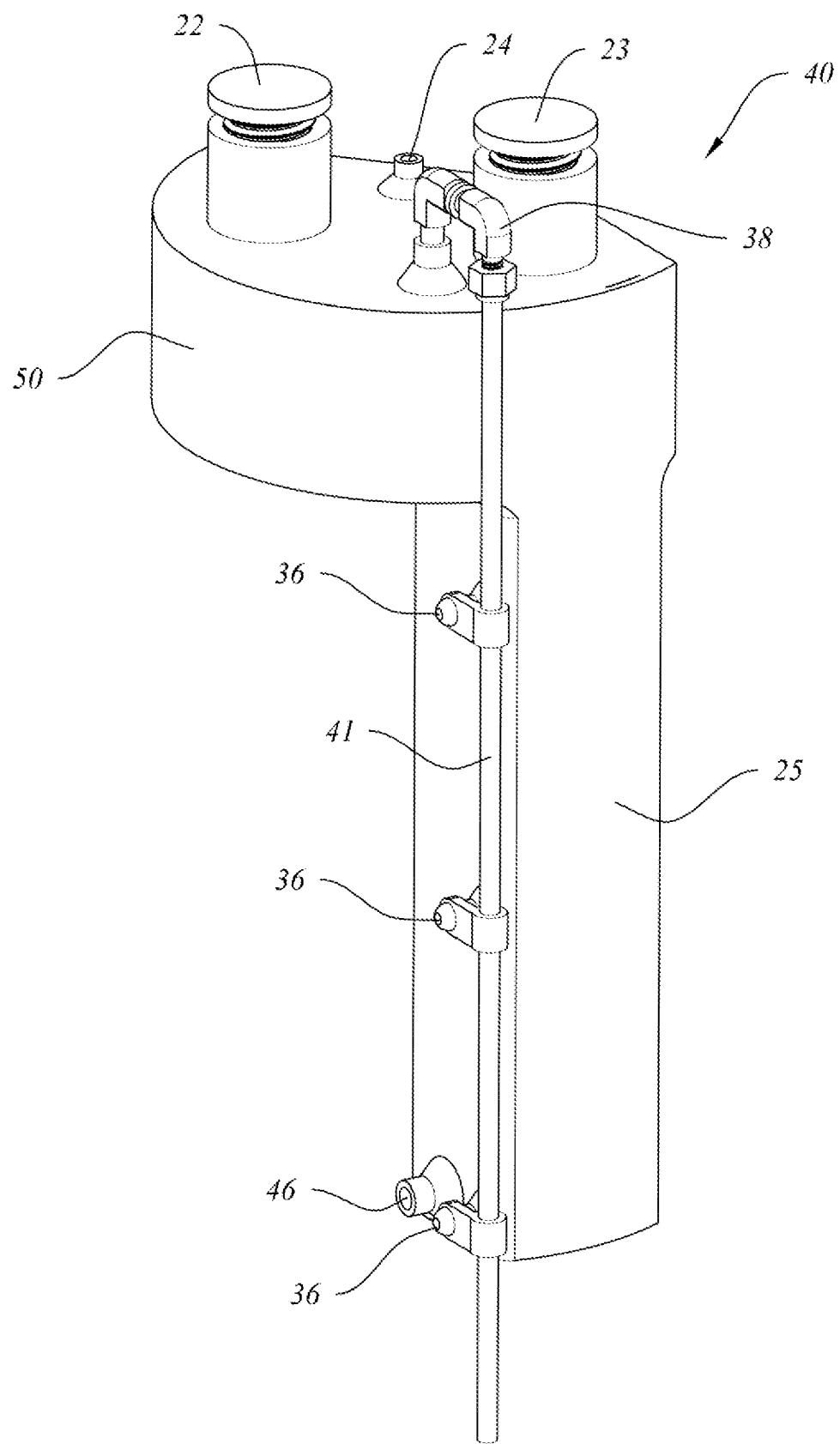
FIG. 7 is a perspective view, showing rear and right sides, of a preferred embodiment of a windshield wiper reservoir system according to the invention.

Referring to FIGS. 3, 5, and 7, windshield wiper reservoir system 40 is connected to frame 70 and forms part of an outer shroud for radiator system 110 to protect interior parts and provide a sealed core cavity 254 to direct air flow from tubes 47 and front grill 51 through interior portions of radiator system 110 and out through rear grill 75. Windshield wiper reservoir system 40 preferably comprises a wiper fluid tank 25, a wiper fluid outlet 46, and a wiper fluid fill port 23. This allows tank 25 to be filled with washer fluid through port 23 and washer fluid to be dispensed to a windshield through outlet 46 (with connecting tubing or hoses). Typically, a windshield wiper tank is mounted to an inner fender or firewall of a car. However, by incorporating system 40 into radiator system 110 according to a preferred embodiment of the invention, room in the engine compartment is freed up for other use or ease of access.

Windshield wiper reservoir system 40 also preferably comprises an overflow tank/recovery reservoir 50 for coolant, an overflow outlet 38, an inlet port 24 to connect to a radiator cap neck overflow port 187 disposed on radiator cap neck 189 (shown in FIG. 6) via tubing, and a coolant fluid fill port 22, but these may also be components separate from system 40. This allows coolant to be added to radiator system 110 through port 22, held in overflow tank 50 when needed, and overflow to discharge through overflow outlet 38. Disposed on a rear side of windshield wiper fluid tank 25 are a plurality of tabs or barrel nuts 36 that provide attachment points for an overflow tube 41 connected to overflow port 38 to allow overflowing coolant to drain out of radiator system 110. Coolant overflow tank 50 is preferably level with the radiator cap 188 disposed above right heat exchange core tank 80 (as shown in FIG. 1). By placing coolant overflow tank 50 at an upper end of system 40, it is well positioned to be level with the radiator cap 188. Coolant overflow tank 50 and windshield wiper tank 25 are separate tanks (to prevent wiper fluid form mixing with coolant) joined together (preferably welded).

Referring to FIGS. 2, 4, 13A, and 13B upper cover or shroud 14 is disposed on an upper side of frame 70 and connected to frame body 71 and rear grill 75 to aid in protecting internal components of radiator system 110 and sealing in core cavity 254. Cover 14 may comprise a substantially flat portion 214 towards the front of frame 70 and angled portion 228 toward rear grill 75, but other configurations may also be used depending on the parameters of the engine compartment for the vehicle in which radiator system 110 is to be installed. When an optional secondary coolant pump system 151 is used, it is preferred to have an angled portion 228 on cover 14 and place coolant pump system 151 on top of the angled portion 228 to conserve space. This provides an overall outer dimension for radiator system 110 that allows radiator system 110 to fit within the space of an engine compartment provided for a typical radiator system that does not have a secondary coolant pump system. Angled portion 228 preferably narrows rearwardly to accommodate coolant overflow tank 50 and upper reservoir tank 16. A bar 234 is disposed on an inner side near a top edge of frame body 71 (as shown in FIG. 3), which is configured to mate with corresponding bar 236 on cover 14 to allow attachment of cover 14 to frame body 71. Most preferably, bars 243 and 236 have aligned holes to accept fasteners from the inside of radiator system 110 so that they are not visible from the top side of cover 14. Also disposed on an interior lower side of angled portion 228 of cover 14 is a mounting bar with tabs 235 that allows cover 14 to be connected to rear grill 75. Preferably there are corresponding holes on an interior side of rear grill that align with the holes in tabs 235 to allow these parts to be connected.

Figure 13A:
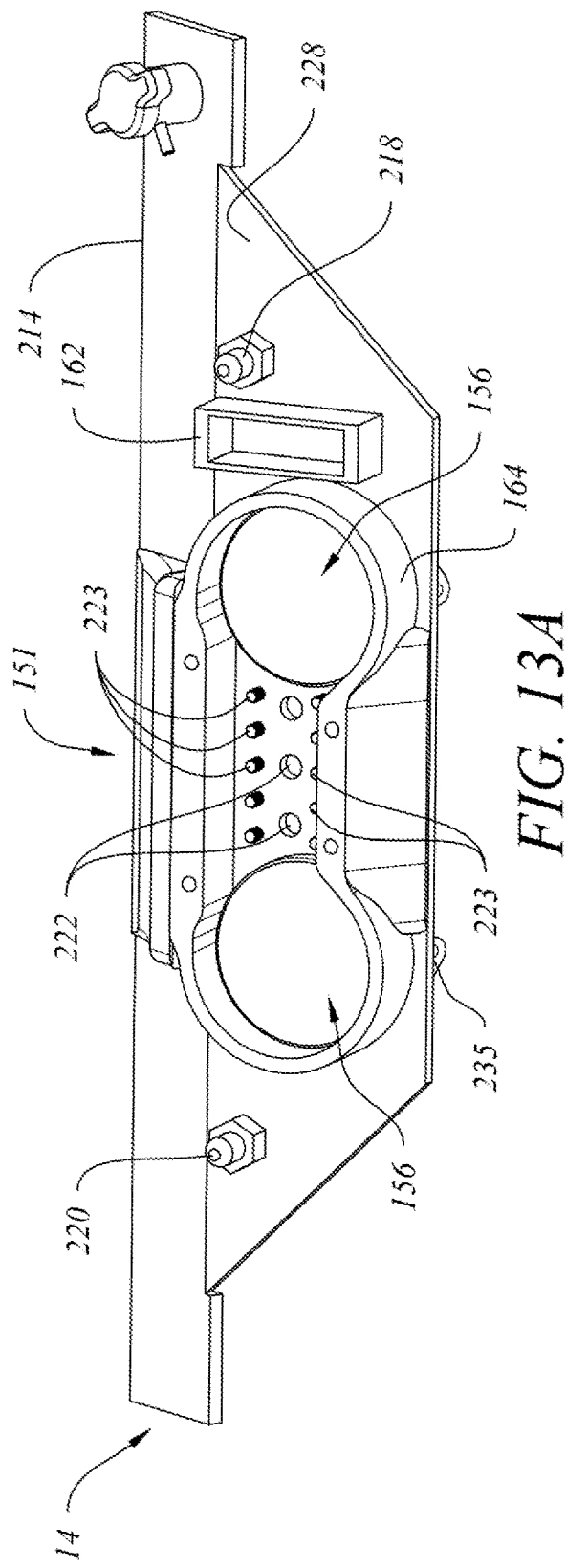
FIG. 13A is a top perspective view of preferred embodiments of an upper shroud and optional secondary coolant pumping system according to the invention.
Figure 13B:
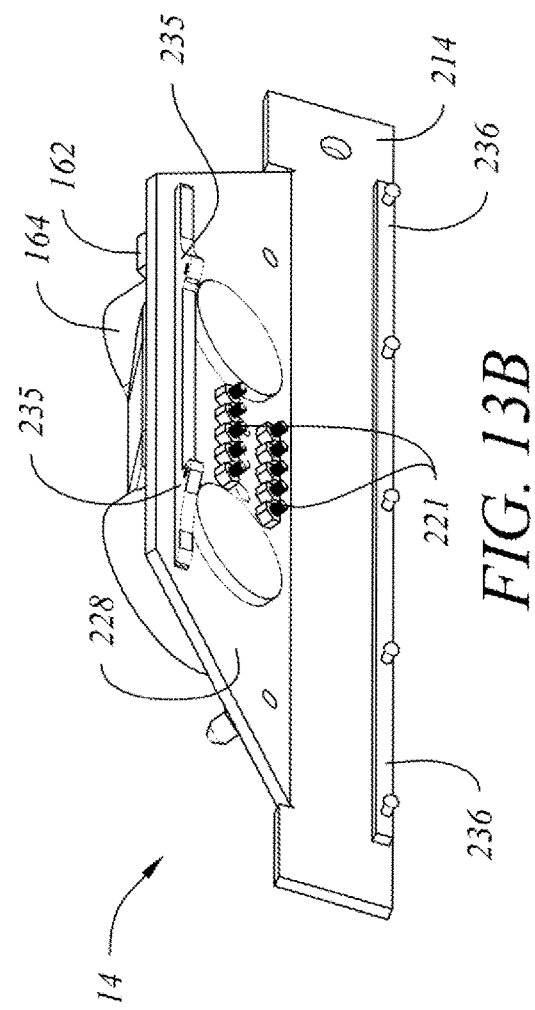
FIG. 13B is a bottom perspective view of the upper shroud and optional secondary coolant pumping system of FIG. 13A.

An engine water (coolant) pump (pre-existing in the vehicle and connected to outlet 215) is typically capable of circulating 90-110 GPM of coolant through radiator system 110 at high RPM. When the engine RPM slows, the flow of coolant from the engine coolant pump also slows. When there is a drastic change in RPM, the coolant circulation from the engine coolant pump can slow while the engine is still running hot and in need of more coolant, not less, which can result in cracked heads or blown head gaskets. Referring to FIGS. 13A, 13B, and 14, an optional secondary coolant pump system 151 is configured to activate when additional coolant flow is needed but is not being pulled via the engine coolant pump. Secondary coolant pump system 151 is preferably disposed on an upper side of shroud 14 and preferably comprises a console or housing 164 with a pump compartment 156 for each of one or more coolant pumps (not shown). Each pump is connected to tubing that pumps coolant from lower reservoir tank 216 through connection port 30 and out through outlet ports 218, 220 in cover 14 to circulate it directly to the head where cooling is needed. A tee fitting may be used to connect a single piece of tubing to reservoir 216 and the coolant pumps in secondary coolant pump system 151. Coolant pumped through secondary coolant pumping system 151 is returned from cooling the engine head to reservoir 16 through inlet 15 or 176. A plurality of isolators 221 connected through holes and with bolts 223 extend from an inner bottom surface of console 164 to aid in isolating the vibration from the coolant pumps. A plurality of apertures 222 are disposed through a bottom surface of console 164 and through shroud 14 to allow for electrical connections to the coolant pumps. Because of sizing restrictions in trying to fit radiator system 110, including the optional coolant pump system 151, within the engine compartment space for a standard radiator, it is preferred to use two smaller coolant pumps to achieve the same flow rate of a larger sized pump.

Radiator system 110 also preferably comprises a control system to send signals to control various components, such as activating pumps in secondary coolant pumping system 151 or fans in the internal fan system, and receive signals or data to monitor various parameters, such as engine temperature (directly or through an existing temperature sending unit), a throttle position sensor, and coolant temperature inside left heat exchange core tank 82 (such as with temperature sensors through ports 17 and 18), for example. This control system comprises standard switches, relays, and the like that are typically used in automotive control systems. A pin outlet 162 for making electrical connections via inserted pins to various sensors and components of the control system is preferably disposed on an upper side of shroud 14, as shown in FIGS. 2 and 13A. Control system may be programmed to activate or deactivate various components of radiator system 110 in response to measured parameters. For example, if a temperature sensor senses that coolant is close to a flash point, a control system may determine that more air circulation is needed so fans in internal fan system are activated to maintain temperature between 165°-180° (other temperature set points may also be used). If control system senses that there has been a drastic change in engine RPM (from high RPM to idle), then optional secondary coolant pumping system 151 may be activated. As another example, if a temperature sensor measures temperatures of around 195° and a throttle position sensor senses that the engine is idling (foot off the gas pedal), then control system may activate optional secondary coolant pumping system and open necessary valves to allow coolant to flow. Various combinations of triggering events may be used with a control system to activate the internal fan system and optional secondary coolant pumping system, as will be understood by those of ordinary skill in the art.

References herein to mounting apertures or holes include apertures fully through the referenced part (for mounting with a bolt and nut, for example) or partial holes configured to accept a fastener (for mounting with a screw into a threaded tap). Various sizes of screws, bolts, and nuts with different threads may be used as will be understood by those of ordinary skill in the art. Parts of frame 70, right and left heat exchange core tanks 80, 82, shroud 14, and windshield wiper reservoir system 40 are preferably made of aluminum for strength, light weight and good heat transference. Tubing, connectors, fasteners, and the like may be made from any suitable materials as will be understood by those of ordinary skill in the art. References to front, forward, and similar terminology herein are in a direction toward a front of an automobile in which radiator system 110 will be installed. References to rear, rearward, and similar terminology herein are in a direction toward a rear of an automobile in which radiator system 110 will be installed. References to left refer to the driver (U.S.) side of the automobile and referenced to right refer to the passenger side of the automobile in which radiator system 110 will be installed. Generally parts of system 110 designated as being on the left may be reoriented to be on the right and vice versa.

Radiator system 110 may comprise any one of or any combination of the preferred features, such as external transmission cooler 53, self-circulating cooling system 20, windshield wiper reservoir system 40, vortex tubes 47, etc., with appropriate modifications as will be understood by those of ordinary skill in the art. Additionally, any of these preferred features may be incorporated into a standard vehicle radiator with modifications that will be understood by those of ordinary skill in the art. Those of ordinary skill in the art will also appreciate upon reading this specification and the description of preferred embodiments herein that modifications and alterations to the apparatus and methods may be made within the scope of the invention and it is intended that the scope of the invention disclosed herein be limited only by the broadest interpretation of the appended claims to which the inventor is legally entitled

I claim:

1. A vehicle engine cooling system comprising:
   a mounting frame comprising an upper portion, a lower portion, a right side, a left side, a front, and a rear, the mounting frame connectable to a vehicle frame;
   a coolant tank connected to and supported by the mounting frame;
   a first plurality of tubes disposed through the coolant tank;
   a windshield washer fluid tank connected to and supported by the mounting frame;
   a cavity disposed inside the mounting frame and configured to receive a radiator core;
   a plurality of apertures disposed through the front of the mounting frame to allow air to enter the cavity; and
   a fan housing disposed within the cavity;
   wherein the left side or the right side of the mounting frame forms an exterior side of the coolant tank;
   wherein the first plurality of tubes is disposed at an angle of around 20° to 50° from a horizontal axis that is substantially perpendicular to the exterior side of the coolant tank.

2. The vehicle engine cooling system of claim 1 wherein the coolant tank is a first coolant tank and the vehicle engine cooling system further comprises a second coolant tank, wherein the left side of the mounting frame forms a side of the first coolant tank and the right side of the mounting frame forms a side of the second coolant tank.

3. The vehicle engine cooling system of claim 2 further comprising a second plurality of tubes disposed through the second coolant tank; and
   wherein each tube in the first plurality of tubes is disposed at an angle of around 20° to 50° from the horizontal axis measured in an upward direction toward the cavity; and
   wherein each tube the second plurality of tubes is disposed at an angle of around 20° to 50° from the horizontal axis measured in a downward direction toward the cavity.

4. The vehicle engine cooling system of claim 1 wherein the front of the mounting frame comprises a front grill.

5. The vehicle engine cooling system according to claim 1 further comprising the radiator core connected to and supported by the mounting frame within the cavity.

6. The vehicle engine cooling system according to claim 1 wherein the coolant tank is integrally formed with the mounting frame and wherein the fan housing is made of metal.

7. The vehicle engine cooling system according to claim 6 further comprising a coolant fill port disposed on the upper portion of the mounting frame.

8. The vehicle engine cooling system according to claim 1 wherein the coolant tank and the windshield washer fluid tank are separate so that coolant in the coolant tank does not mix with windshield wiper fluid in the windshield washer fluid tank.

9. The vehicle engine cooling system according to claim 6 wherein the coolant tank is at least partially disposed in the upper portion of the mounting frame.

10. The vehicle engine cooling system according to claim 1 wherein the upper portion of the mounting frame comprises a top surface that forms an upper side of the coolant tank.

11. The vehicle engine cooling system according to claim 1 wherein the coolant tank comprises an overflow tank for coolant.

12. The vehicle engine cooling system according to claim 1 wherein the coolant tank comprises a heat exchange tank.

13. The vehicle engine cooling system according to claim 1 wherein the coolant tank is disposed on one of left or the right side of the mounting frame and the windshield washer fluid tank is disposed on the other of the left or the right side of the mounting frame.

14. The vehicle engine cooling system according to claim 1 further comprising at least one air flow path, the at least one air flow path comprising an inlet at the front of the mounting frame and an outlet at the rear of the mounting frame.

15. The vehicle engine cooling system according to claim 14 wherein the inlet comprises at least one of the plurality of apertures disposed through the front of the mounting frame.

16. The vehicle engine cooling system according to claim 1 further comprising a mounting tab integrally formed with the mounting frame and disposed on the lower portion of the mounting frame.

17. The vehicle engine cooling system according to claim 1 further comprising a first mounting block disposed on the left side of the mounting frame and a second mounting block disposed on the right side of the mounting frame, wherein each mounting block is configured to allow the mounting frame to be connected to the vehicle frame and each mounting block is integrally formed with the mounting frame.

18. The vehicle engine cooling system according to claim 1 further comprising a transmission cooling tube disposed inside the mounting frame, the transmission cooling tube comprising an inlet and an outlet both disposed through the mounting frame.

19. The vehicle engine cooling system according to claim 1 further comprising:
   a first mounting block disposed on the left side of the mounting frame;

a second mounting block disposed on the right side of the mounting frame;

at least one air flow path through the cavity and at least partially in contact with the coolant tank to allow heat exchange between coolant in the coolant tank and air flowing through the at least one air flow path, the at least one air flow path comprising an inlet through at least one of the plurality of apertures disposed through the front of the mounting frame and an outlet at the rear of the mounting frame;

the radiator core connected to and supported by the mounting frame within the cavity;

a coolant fill port disposed on the upper portion of the mounting frame;

a transmission cooling tube disposed inside the mounting frame, the transmission cooling tube comprising an inlet and an outlet both disposed through the mounting frame;

wherein each mounting block is configured to allow the mounting frame to be connected to the vehicle frame and each mounting block is integrally formed with the mounting frame;

wherein the coolant tank is integrally formed with the mounting frame and is disposed on one of left or the right side of the mounting frame and wherein the windshield washer fluid tank is disposed on the other of the left or the right side of the mounting frame; and wherein the coolant tank and the windshield washer fluid tank are separate so that coolant in the coolant tank does not mix with windshield wiper fluid in the windshield washer fluid tank.

20. A vehicle engine cooling system comprising:

a mounting frame comprising an upper portion, a lower portion, a right side, a left side, a front, and a rear, the mounting frame connectable to a vehicle frame;

a coolant tank connected to and supported by the mounting frame;

a windshield washer fluid tank connected to and supported by the mounting frame;

a cavity disposed inside the mounting frame and configured to receive a radiator core;

a plurality of front apertures disposed through the front of the mounting frame to allow air to enter the cavity;

a plurality of side apertures disposed through the left side or the right side of the mounting frame or both to allow air to enter the cavity; and a fan housing disposed within the cavity.

21. A vehicle engine cooling system comprising:

a mounting frame comprising an upper portion, a lower portion, a right side, a left side, a front, and a rear, the mounting frame connectable to a vehicle frame;

a coolant tank connected to and supported by the mounting frame, wherein the coolant tank is connected to one of the left side or the right side of the mounting frame;

a windshield washer fluid tank connected to and supported by the mounting frame;

a cavity disposed inside the mounting frame and configured to receive a radiator core;

a plurality of front apertures disposed through the front of the mounting frame to allow air to enter the cavity;

a plurality of side apertures disposed through the one of the left side or the right side of the mounting frame to which the coolant tank is connected to allow air to enter the cavity;

a plurality of rear apertures disposed through the rear of the mounting frame to allow air to exit the cavity;

a first air flow path from the plurality of apertures disposed through the front of the mounting frame, through the cavity, and out the plurality of rear apertures disposed through the rear of the mounting frame;

a second air flow path from the plurality of side apertures disposed through the one of the left side or the right side of the mounting frame to which the coolant tank is connected, through the cavity, and out the plurality of rear apertures disposed through the rear of the mounting frame;

wherein each of the first air flow path and the second air flow path is at least partially in contact with the coolant tank to allow heat exchange between coolant in the coolant tank and air flowing through the first air flow path and the second air flow path.

* * * * *